(12) United States Patent
Zheng

(10) Patent No.: US 8,090,041 B2
(45) Date of Patent: Jan. 3, 2012

(54) SYSTEMS AND METHODS FOR FORWARD LINK CLOSED LOOP BEAMFORMING

(75) Inventor: Dunmin Zheng, Vienna, VA (US)

(73) Assignee: ATC Technologies LLC, Reston, VA (US)

( * ) Notice: Subject to any disclaimer, the term of this patent is extended or adjusted under 35 U.S.C. 154(b) by 1361 days.

(21) Appl. No.: 11/624,531

(22) Filed: Jan. 18, 2007

(65) Prior Publication Data

US 2008/0008264 A1 Jan. 10, 2008

Related U.S. Application Data

(60) Provisional application No. 60/760,432, filed on Jan. 20, 2006.

(51) Int. Cl.
*H04B 7/06* (2006.01)
*H04L 27/20* (2006.01)

(52) U.S. Cl. .................... 375/267; 375/299

(58) Field of Classification Search .......... 375/141, 375/144, 146, 147, 148, 259, 260, 267, 299; 370/310, 334; 455/427, 440, 12.1; 342/352, 342/357.01, 357.06, 357.08, 357.09, 357.16, 342/357.17
See application file for complete search history.

(56) References Cited

U.S. PATENT DOCUMENTS

| | | |
|---|---|---|
| 4,901,307 A | 2/1990 | Gilhousen et al. |
| 5,073,900 A | 12/1991 | Mallinckrodt |
| 5,303,286 A | 4/1994 | Wiedeman |
| 5,339,330 A | 8/1994 | Mallinckrodt |
| 5,394,561 A | 2/1995 | Freeburg |
| 5,446,756 A | 8/1995 | Mallinckrodt |
| 5,448,623 A | 9/1995 | Wiedeman et al. |
| 5,511,233 A | 4/1996 | Otten |
| 5,555,257 A | 9/1996 | Dent |
| 5,584,046 A | 12/1996 | Martinez et al. |
| 5,612,703 A | 3/1997 | Mallinckrodt |
| 5,619,525 A | 4/1997 | Wiedeman et al. |
| 5,631,898 A | 5/1997 | Dent |

(Continued)

FOREIGN PATENT DOCUMENTS

EP 0 506 255 A2 9/1992

(Continued)

OTHER PUBLICATIONS

Hamalainen, J. et al. "Closed Loop Transmit Diversity for FDD WCDMA systems" *Signals, Systems and Computers*, Conference Record of the thirty-fourth Asilomar Conference, IEEE vol. 1(29), pp. 111-115, 2000.

(Continued)

*Primary Examiner* — Young T. Tse
(74) *Attorney, Agent, or Firm* — Myers Bigel Sibley & Sajovec

(57) ABSTRACT

Methods of forming a beam to a wireless terminal from a transmitter including an antenna having a plurality of antenna feed elements include generating channel estimates at the wireless terminal, obtaining channel phase information from the channel estimates, quantizing the channel phase information to obtain quantized channel phase values, and transmitting the quantized channel phase values to the transmitter. The methods may further include receiving the quantized channel phase values at the transmitter, obtaining channel gain estimates, constructing channel estimates using the quantized channel phase values and the channel gain estimates, and determining transmit beamforming weights in response to the channel estimates. Related transmitters, wireless terminals, and communications systems are also disclosed.

56 Claims, 8 Drawing Sheets

U.S. PATENT DOCUMENTS

| | | | |
|---|---|---|---|
| 5,761,605 A | 6/1998 | Tawil et al. | |
| 5,765,098 A | 6/1998 | Bella | |
| 5,812,947 A | 9/1998 | Dent | |
| 5,832,379 A | 11/1998 | Mallinckrodt | |
| 5,835,857 A | 11/1998 | Otten | |
| 5,848,060 A | 12/1998 | Dent | |
| 5,852,721 A | 12/1998 | Dillon et al. | |
| 5,878,329 A | 3/1999 | Mallinckrodt | |
| 5,884,142 A | 3/1999 | Wiedeman et al. | |
| 5,907,541 A | 5/1999 | Fairholm et al. | |
| 5,926,758 A | 7/1999 | Grybos et al. | |
| 5,930,288 A * | 7/1999 | Eberhardt | 375/148 |
| 5,937,332 A | 8/1999 | Karabinis | |
| 5,940,753 A | 8/1999 | Mallinckrodt | |
| 5,991,345 A | 11/1999 | Ramasastry | |
| 5,995,832 A | 11/1999 | Mallinckrodt | |
| 6,011,951 A | 1/2000 | King et al. | |
| 6,023,605 A | 2/2000 | Sasaki et al. | |
| 6,052,560 A | 4/2000 | Karabinis | |
| 6,052,586 A | 4/2000 | Karabinis | |
| 6,067,442 A | 5/2000 | Wiedeman et al. | |
| 6,072,430 A | 6/2000 | Wyrwas et al. | |
| 6,085,094 A | 7/2000 | Vasudevan et al. | |
| 6,091,933 A | 7/2000 | Sherman et al. | |
| 6,097,752 A | 8/2000 | Wiedeman et al. | |
| 6,101,385 A | 8/2000 | Monte et al. | |
| 6,108,561 A | 8/2000 | Mallinckrodt | |
| 6,134,437 A | 10/2000 | Karabinis et al. | |
| 6,157,811 A | 12/2000 | Dent | |
| 6,157,834 A | 12/2000 | Helm et al. | |
| 6,160,994 A | 12/2000 | Wiedeman | |
| 6,169,878 B1 | 1/2001 | Tawil et al. | |
| 6,195,045 B1 | 2/2001 | Xu et al. | |
| 6,198,730 B1 | 3/2001 | Hogberg et al. | |
| 6,198,921 B1 | 3/2001 | Youssefzadeh et al. | |
| 6,201,967 B1 | 3/2001 | Goerke | |
| 6,233,463 B1 | 5/2001 | Wiedeman et al. | |
| 6,240,124 B1 | 5/2001 | Wiedeman et al. | |
| 6,253,080 B1 | 6/2001 | Wiedeman et al. | |
| 6,256,497 B1 | 7/2001 | Chambers | |
| 6,324,405 B1 | 11/2001 | Young et al. | |
| 6,339,707 B1 | 1/2002 | Wainfan et al. | |
| 6,418,147 B1 | 7/2002 | Wiedeman | |
| 6,449,461 B1 | 9/2002 | Otten | |
| 6,522,865 B1 | 2/2003 | Otten | |
| 6,628,919 B1 | 9/2003 | Curello et al. | |
| 6,684,057 B2 | 1/2004 | Karabinis | |
| 6,735,437 B2 | 5/2004 | Mayfield et al. | |
| 6,775,251 B1 | 8/2004 | Wiedeman et al. | |
| 6,785,543 B2 | 8/2004 | Karabinis | |
| 6,856,787 B2 | 2/2005 | Karabinis | |
| 6,859,652 B2 | 2/2005 | Karabinis et al. | |
| 6,879,829 B2 | 4/2005 | Dutta et al. | |
| 6,892,068 B2 | 5/2005 | Karabinis et al. | |
| 6,937,857 B2 | 8/2005 | Karabinis | |
| 6,975,837 B1 | 12/2005 | Santoru | |
| 6,999,720 B2 | 2/2006 | Karabinis | |
| 7,006,789 B2 | 2/2006 | Karabinis et al. | |
| 7,031,702 B2 | 4/2006 | Karabinis et al. | |
| 7,039,400 B2 | 5/2006 | Karabinis et al. | |
| 7,062,267 B2 | 6/2006 | Karabinis | |
| 7,092,708 B2 | 8/2006 | Karabinis | |
| 7,113,743 B2 | 9/2006 | Karabinis | |
| 7,113,778 B2 | 9/2006 | Karabinis | |
| 2002/0122408 A1 | 9/2002 | Mullins | |
| 2002/0146979 A1 | 10/2002 | Regulinski et al. | |
| 2002/0177465 A1 | 11/2002 | Robinett | |
| 2003/0003815 A1 | 1/2003 | Yamada | |
| 2003/0022625 A1 | 1/2003 | Otten et al. | |
| 2003/0035490 A1 | 2/2003 | Gollamudi | |
| 2003/0054762 A1 | 3/2003 | Karabinis | |
| 2003/0149986 A1 | 8/2003 | Mayfield et al. | |
| 2003/0153308 A1 | 8/2003 | Karabinis | |
| 2004/0072539 A1 | 4/2004 | Monte et al. | |
| 2004/0102156 A1 | 5/2004 | Loner | |
| 2004/0121727 A1 | 6/2004 | Karabinis | |
| 2004/0142660 A1 | 7/2004 | Churan | |
| 2004/0192200 A1 | 9/2004 | Karabinis | |
| 2004/0192395 A1 | 9/2004 | Karabinis | |
| 2004/0203393 A1 | 10/2004 | Chen | |
| 2004/0240525 A1 | 12/2004 | Karabinis et al. | |
| 2005/0026606 A1 | 2/2005 | Karabinis | |
| 2005/0037749 A1 | 2/2005 | Karabinis et al. | |
| 2005/0041619 A1 | 2/2005 | Karabinis et al. | |
| 2005/0079816 A1 | 4/2005 | Singh et al. | |
| 2005/0090256 A1 | 4/2005 | Dutta | |
| 2005/0118948 A1 | 6/2005 | Karabinis et al. | |
| 2005/0136836 A1 | 6/2005 | Karabinis et al. | |
| 2005/0164700 A1 | 7/2005 | Karabinis | |
| 2005/0164701 A1 | 7/2005 | Karabinis et al. | |
| 2005/0170834 A1 | 8/2005 | Dutta et al. | |
| 2005/0181786 A1 | 8/2005 | Karabinis et al. | |
| 2005/0201449 A1 | 9/2005 | Churan | |
| 2005/0208890 A1 | 9/2005 | Karabinis | |
| 2005/0221757 A1 | 10/2005 | Karabinis | |
| 2005/0227618 A1 | 10/2005 | Karabinis et al. | |
| 2005/0239399 A1 | 10/2005 | Karabinis | |
| 2005/0239403 A1 | 10/2005 | Karabinis | |
| 2005/0239404 A1 | 10/2005 | Karabinis | |
| 2005/0239457 A1 | 10/2005 | Levin et al. | |
| 2005/0245192 A1 | 11/2005 | Karabinis | |
| 2005/0260947 A1 | 11/2005 | Karabinis et al. | |
| 2005/0260984 A1 | 11/2005 | Karabinis | |
| 2005/0265273 A1 | 12/2005 | Karabinis et al. | |
| 2005/0272369 A1 | 12/2005 | Karabinis et al. | |
| 2005/0282542 A1 | 12/2005 | Karabinis | |
| 2005/0288011 A1 | 12/2005 | Dutta | |
| 2006/0040613 A1 | 2/2006 | Karabinis et al. | |
| 2006/0040657 A1 | 2/2006 | Karabinis et al. | |
| 2006/0040659 A1 | 2/2006 | Karabinis | |
| 2006/0094352 A1 | 5/2006 | Karabinis | |
| 2006/0094420 A1 | 5/2006 | Karabinis | |
| 2006/0105707 A1 | 5/2006 | Karabinis | |
| 2006/0111041 A1 | 5/2006 | Karabinis | |
| 2006/0111056 A1 | 5/2006 | Dutta | |
| 2006/0135058 A1 | 6/2006 | Karabinis | |
| 2006/0135060 A1 | 6/2006 | Karabinis | |
| 2006/0135070 A1 | 6/2006 | Karabinis | |
| 2006/0165120 A1 | 7/2006 | Karabinis | |
| 2006/0189274 A1 | 8/2006 | Karabinis | |
| 2006/0189275 A1 | 8/2006 | Karabinis | |
| 2006/0189309 A1 | 8/2006 | Good et al. | |
| 2006/0194576 A1 | 8/2006 | Karabinis et al. | |
| 2006/0205346 A1 | 9/2006 | Evans et al. | |
| 2006/0205347 A1 | 9/2006 | Karabinis | |
| 2006/0205367 A1 | 9/2006 | Karabinis | |
| 2006/0211371 A1 | 9/2006 | Karabinis et al. | |
| 2006/0211419 A1 | 9/2006 | Karabinis | |
| 2006/0211452 A1 | 9/2006 | Karabinis | |
| 2006/0217070 A1 | 9/2006 | Karabinis | |
| 2006/0232465 A1 | 10/2006 | Levin et al. | |
| 2006/0233147 A1 | 10/2006 | Karabinis | |
| 2006/0246838 A1 | 11/2006 | Karabinis | |
| 2006/0252368 A1 | 11/2006 | Karabinis | |
| 2006/0276129 A1 | 12/2006 | Karabinis | |
| 2006/0292990 A1 | 12/2006 | Karabinis et al. | |
| 2009/0028262 A1 * | 1/2009 | Imai et al. | 375/267 |

FOREIGN PATENT DOCUMENTS

| | | |
|---|---|---|
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| WO | WO 00/72464 A1 | 11/2000 |
| WO | WO 01/54314 A1 | 7/2001 |
| WO | WO 02/095982 A1 | 11/2002 |

OTHER PUBLICATIONS

International Search Report and Written Opinion for International Application No. PCT/US2007/001466, Mailed Jun. 1, 2007.

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Ayyagari et al., "A satellite-augmented cellular network concept", *Wireless Networks*, Vo. 4, 1998, pp. 189-198.

* cited by examiner

SYSTEMS AND METHODS FOR FORWARD LINK CLOSED LOOP BEAMFORMING

CROSS REFERENCE TO RELATED APPLICATION

This application claims the benefit of and priority to U.S. Provisional Patent Application No. 60/760,432, filed Jan. 20, 2006, the disclosure of which is hereby incorporated herein by reference as if set forth in its entirety.

FIELD OF THE INVENTION

The present invention relates to systems and methods for satellite communications. In particular, the present invention relates to systems and methods for wireless communications employing beamforming.

BACKGROUND

Satellite communications systems and methods are widely used for radiotelephone communications. Satellite communications systems and methods generally employ at least one space-based component, such as one or more satellites, that is/are configured to wirelessly communicate with a plurality of wireless terminals.

A satellite communications system or method may utilize a single antenna beam or antenna pattern covering an entire area served by the system. Alternatively, or in combination with the above, in cellular satellite communications systems and methods, multiple beams (cells or antenna patterns) are provided, each of which can serve a substantially distinct geographic area in an overall service region, to collectively serve an overall satellite footprint. Thus, a cellular architecture similar to that used in conventional terrestrial cellular radiotelephone systems and methods can be implemented in cellular satellite-based systems and methods. The satellite typically communicates with wireless terminals over a bidirectional communications pathway, with wireless terminal communications signals being communicated from the satellite to a wireless terminal over a downlink or forward link (also referred to as a forward service link), and from the wireless terminal to the satellite over an uplink or return link (also referred to as a return service link).

The overall design and operation of cellular satellite communications systems and methods are well known to those having skill in the art, and need not be described further herein. Moreover, as used herein, the term "wireless terminal" includes devices which include a radio frequency transceiver, such as cellular and/or satellite radiotelephones; Personal Communications System (PCS) terminals that may combine a radiotelephone with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) receiver; and/or conventional laptop and/or palmtop computers or other appliances, which include a radio frequency transceiver. As used herein, the term "wireless terminal" also includes any other radiating user device/equipment/source that may have time-varying or fixed geographic coordinates, and may be portable, transportable, installed in a vehicle (aeronautical, maritime, or land-based), or situated and/or configured to operate locally and/or in a distributed fashion over one or more terrestrial and/or extraterrestrial locations. A wireless terminal also may be referred to herein as a "Customer Premises Equipment" (CPE) terminal, "radiotelephone," "radioterminal," "mobile terminal," "mobile user terminal," "user device" or simply as a "terminal". Furthermore, as used herein, the term "space-based" component includes one or more satellites and/or one or more other objects/platforms (e.g., airplanes, balloons, unmanned vehicles, space crafts, missiles, etc.) that have a trajectory above the earth at any altitude. In addition, as used herein the term "canceling" or "cancellation" as relating to interference canceling or cancellation means complete elimination of at least one component/element of the interference and/or at least a reduction of at least one component/element of the interference.

A terrestrial network that is configured to provide wireless communications by using and/or reusing at least some of the frequencies authorized for use by a satellite system can enhance the availability, efficiency and/or economic viability of the satellite system. Specifically, it is known that it may be difficult for satellite communications systems to reliably serve densely populated areas, because satellite signals may be blocked by high-rise structures and/or may not effectively penetrate into buildings. As a result, the satellite spectrum may be underutilized or unutilized in such areas. The terrestrial use and/or reuse of at least some of the satellite system frequencies can reduce or eliminate this potential problem.

Moreover, a capacity measure of an overall system, including a terrestrially-based and a space-based network, may be increased by the introduction of terrestrial frequency use/reuse of at least some of the frequencies authorized for use by the space-based network, since terrestrial frequency use/reuse may be much denser than that of a satellite-only (space-based network only) system. In fact, capacity may be enhanced where it may be most needed, i.e., in densely populated urban/industrial/commercial areas. As a result, the overall system may become more economically viable, as it may be able to serve a larger subscriber base more effectively and reliably.

One example of terrestrial reuse of satellite frequencies is described in U.S. Pat. No. 5,937,332 to Karabinis entitled Satellite Telecommunications Repeaters and Retransmission Methods, the disclosure of which is hereby incorporated herein by reference in its entirety as if set forth fully herein. As described therein, satellite telecommunications repeaters are provided which receive, amplify, and locally retransmit the downlink/uplink signal received from a satellite/radioterminal thereby increasing the effective downlink/uplink margin in the vicinity of the satellite telecommunications repeaters and allowing an increase in the penetration of uplink and downlink signals into buildings, foliage, transportation vehicles, and other objects which can reduce link margin. Both portable and non-portable repeaters are provided. See the abstract of U.S. Pat. No. 5,937,332.

Radioterminals for a satellite communications system or method having a terrestrial communications capability by terrestrially using and/or reusing at least some of the frequencies of a satellite frequency band that is also used, at least in part, by the radioterminals for space-based communications, wherein the radioterminals are configured to communicate terrestrially and via a space-based component by using substantially the same air interface for both terrestrial and space-based communications, may be more cost effective and/or aesthetically appealing than other alternatives. Conventional dual band/dual mode wireless terminal alternatives, such as the well known Thuraya, Iridium and/or Globalstar dual mode satellite/terrestrial wireless terminals, duplicate some components (as a result of the different frequency bands and/or air interface protocols between satellite and terrestrial communications), which may lead to increased cost, size and/or weight of the wireless terminal. See U.S. Pat. No.

6,052,560 to Karabinis, entitled Satellite System Utilizing a Plurality of Air Interface Standards and Method Employing Same.

Satellite communications systems and methods that may employ terrestrial reuse of satellite frequencies are described in U.S. Pat. No. 6,684,057 to Karabinis, entitled Systems and Methods for Terrestrial Reuse of Cellular Satellite Frequency Spectrum; and Published U.S. Patent Application Nos. US 2003/0054760 to Karabinis, entitled Systems and Methods for Terrestrial Reuse of Cellular Satellite Frequency Spectrum; US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0073436 to Karabinis et al., entitled Additional Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2003/0153267 to Karabinis, entitled Wireless Communications Systems and Methods Using Satellite-Linked Remote Terminal Interface Subsystems; US 2003/0224785 to Karabinis, entitled Systems and Methods for Reducing Satellite Feeder Link Bandwidth/Carriers In Cellular Satellite Systems; US 2002/0041575 to Karabinis et al., entitled Coordinated Satellite-Terrestrial Frequency Reuse; US 2002/0090942 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; US 2003/0068978 to Karabinis et al., entitled Space-Based Network Architectures for Satellite Radiotelephone Systems; US 2003/0143949 to Karabinis, entitled Filters for Combined Radiotelephone/GPS Terminals; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, all of which are assigned to the assignee of the present invention, the disclosures of all of which are hereby incorporated herein by reference in their entirety as if set forth fully herein.

Some satellite communications systems and methods may employ interference cancellation techniques to allow increased terrestrial use/reuse of satellite frequencies. For example, as described in U.S. Pat. No. 6,684,057 to Karabinis, cited above, a satellite communications frequency can be reused terrestrially by an ancillary terrestrial network even within the same satellite cell that is using the satellite communications frequency for space-based communications, using interference cancellation techniques. Moreover, the ancillary terrestrial network can use a modified range of satellite band forward link frequencies for transmission, to reduce interference with at least some out-of-band receivers. A modified range of satellite band forward link frequencies that is used by the ancillary terrestrial network can include only a subset of the satellite band forward link frequencies to provide a guard band between frequencies used by the ancillary terrestrial network and frequencies used by out-of-band receivers, can include power levels that monotonically decrease as a function of increasing/decreasing frequency and/or can include two or more contiguous slots per frame that are left unoccupied and/or are transmitted at reduced maximum power. Time division duplex operation of the ancillary terrestrial network may also be provided over at least a portion of the satellite band return link frequencies. Full or partial reverse mode operation of the ancillary terrestrial network also may be provided, where at least some of the forward link and return link frequencies are interchanged with the conventional satellite forward link and return link frequencies. See the Abstract of U.S. Pat. No. 6,684,057.

SUMMARY

Some embodiments of the invention provide methods of forming a beam to a wireless terminal from a transmitter including an antenna having a plurality of antenna feed elements. The methods include generating channel estimates at the wireless terminal, obtaining channel phase information from the channel estimates, quantizing the channel phase information to obtain quantized channel phase values, and transmitting the quantized channel phase values to the transmitter. The quantized channel phase values may include in-phase (I) and quadrature (Q) quantized phase values for channels from each of the plurality of antenna feed elements to the receiver, and the methods may further include constructing a frame structure including in-phase (I) and quadrature (Q) quantized phase values for each of the channels. Furthermore, transmitting the quantized channel phase values may include transmitting the frame structure on a return link control channel.

The frame structure may include M in-phase (I) quantized phase values and M quadrature (Q) quantized phase values corresponding to M of the plurality of antenna feed elements, and the frame structure may include the M in-phase (I) quantized phase values followed by the M quadrature (Q) quantized phase values.

Quantizing the channel phase information may include quantizing the channel phase information using a 2-bit quantization for each channel. The channel phase information may include in-phase (I) and quadrature (Q) phase information for channels from each of the plurality of antenna feed elements to the wireless terminal, and quantizing the channel phase information may include quantizing the in-phase (I) phase information with a first bit and quantizing the quadrature (Q) phase information with a second bit. In particular, quantizing the channel phase information may include quantizing the in-phase (I) phase information as $\pi$ or 0 and quantizing the quadrature (Q) phase information as $\pi/2$ or $-\pi/2$.

The methods may further include determining a geographic location of the wireless terminal, and transmitting the determined geographic location to the transmitter.

The methods may further include receiving the quantized channel phase values at the transmitter, obtaining channel gain estimates, constructing channel estimates using the quantized channel phase values and the channel gain estimates, and determining transmit beamforming weights in response to the channel estimates.

Receiving the quantized channel phase values may include receiving a frame structure including quantized channel phase values for M of the plurality of channels. The frame structure may include M in-phase (I) quantized phase values followed by M quadrature (Q) quantized phase values.

The methods may further include generating a channel phase estimate for an mth channel of the M channels in response to an in-phase (I) quantized phase value and a quadrature (Q) quantized phase value for the mth channel, constructing a channel estimate for the channel may include constructing a channel estimate using the channel phase estimate and the channel gain estimate for the channel.

The methods may further include updating the channel phase estimate for the mth channel upon receipt of a most recently received one of an in-phase (I) quantized phase value for the mth channel or a quadrature (Q) quantized phase value for the mth channel.

Updating the channel phase estimate for the mth channel may include updating the channel phase estimate for the mth channel according to the following equation $$\hat{\phi}_{n,m} = \frac{1}{2}\left(e^{j\hat{\theta}_{n,m}} + e^{j\hat{\theta}_{n-1,m}}\right)$$

where $\hat{\theta}_{n,m}$ is the in-phase (I) or quadrature (Q) quantized phase value for the mth channel received in an nth time index.

The methods may further include receiving an indication of the location of the wireless terminal from the wireless terminal, and obtaining channel gain estimates may include obtaining an average feed gain value from a feed gain database in response to a location of the wireless terminal.

Determining transmit beamforming weights in response to the channel estimates may include determining transmit beamforming weights that generate an increased response in a direction of the wireless terminal. Determining transmit beamforming weights may further include determining transmit beamforming weights that generate a null response in a direction of another wireless terminal.

A transmitter for use in a wireless communications system according to some embodiments of the invention includes a plurality of antenna feed elements, a phase bits detector, a phase vector constructor, a gain vector constructor, a vector channel constructor, and an adaptive beamformer. The phase bits detector is configured to receive quantized channel phase values. The phase vector constructor is configured to generate a vector of channel phase estimates for a plurality of channels from the plurality of antenna feed elements to a wireless terminal in response to the quantized channel phase values. The gain vector constructor is configured to generate a vector of channel gain estimates for the plurality of channels. The vector channel constructor is configured to generate a vector of channel estimates for the plurality of channels in response to the vector of channel phase estimates and the vector of channel gain estimates. Finally, the adaptive beamformer is configured to generate a vector of transmit beamforming weights in response to the vector of channel estimates.

The phase bits detector may be further configured to receive a frame structure including quantized channel phase values for M of the plurality of channels over a return link control channel. In particular, the frame structure may include M in-phase (I) quantized phase values followed by M quadrature (Q) quantized phase values.

The phase vector constructor may be further configured to generate a channel phase estimate for an mth channel of the plurality of channels in response to an in-phase (I) quantized phase value and a quadrature (Q) quantized phase value for the mth channel, and the vector channel constructor may be further configured to construct a channel estimate for the mth channel using the channel phase estimate for the mth channel and a channel gain estimate for the mth channel.

The phase vector constructor may be further configured to update the channel phase estimate for the mth channel upon receipt of a most recently received one of an in-phase (I) quantized phase value for the channel or a quadrature (Q) quantized phase value for the mth channel. In particular, the phase vector constructor may be further configured to update the channel phase estimate for the mth channel according to the following equation:

$$\hat{\phi}_{n,m} = \frac{1}{2}\left(e^{j\hat{\theta}_{n,m}} + e^{j\hat{\theta}_{n-1,m}}\right)$$

where $\hat{\theta}_{n,m}$ is the in-phase (I) or quadrature (Q) quantized phase value for the mth channel received in an nth time index.

The transmitter may further include a feed gain database containing average feed gain information, and the gain vector constructor may be further configured to obtain channel gain estimates by obtaining an average feed gain value from the feed gain database in response to a location of the wireless terminal. The gain vector constructor may be further configured to receive an indication of the location of the wireless terminal from the wireless terminal.

The adaptive beamformer may be further configured to determine transmit beamforming weights that generate an increased response in a direction of the wireless terminal. The adaptive beamformer may be further configured to determine transmit beamforming weights that generate a null response in a direction of another wireless terminal.

According to some embodiments of the invention, a wireless terminal for use in a communications system includes a vector channel estimator configured to generate channel estimates for a plurality of channels to the wireless terminal from a plurality of antenna feed elements at a remote transmitter, a phase vector calculator configured to obtain channel phase information from the channel estimates, and a phase quantizer configured to quantize the channel phase information to obtain quantized channel phase values.

The quantized channel phase values may include in-phase (I) and quadrature (Q) quantized phase values for channels from each of the plurality of antenna feed elements to the wireless terminal, and the wireless terminal may further include a frame packer configured to construct a frame structure including in-phase (I) and quadrature (Q) quantized phase values for each of the plurality of channels.

The frame structure may include M in-phase (I) quantized phase values and M quadrature (Q) quantized phase values corresponding to M of the antenna feed elements, and the frame structure may include the M in-phase (I) quantized phase values followed by the M quadrature (Q) quantized phase values.

The phase quantizer may be further configured to quantize the channel phase information using a 2-bit quantization for each channel. The channel phase information may include in-phase (I) and quadrature (Q) phase information for channels from each of the plurality of antenna feed elements to the wireless terminal, and the phase quantizer may be further configured to quantize the in-phase (I) phase information with a first bit and the quadrature (Q) phase information with a second bit. In particular, the phase quantizer may be further configured to quantize the in-phase (I) phase information as $\pi$ or 0 and quantizing the quadrature (Q) phase information as $\pi/2$ or $-\pi/2$.

The wireless terminal may further include a location determination unit configured to determine a geographic location of the wireless terminal.

A communications system according to some embodiments of the invention includes a wireless terminal and a transmitter. The wireless terminal includes a vector channel estimator configured to generate channel estimates for a plurality of channels to the wireless terminal, a phase vector calculator configured to obtain channel phase information from the channel estimates, a phase quantizer configured to quantize the channel phase information to obtain quantized channel phase values, and a transceiver configured to transmit the quantized channel phase values. The transmitter includes a plurality of antenna feed elements, a phase bits detector, a phase vector constructor, a gain vector constructor, a vector channel constructor, and an adaptive beamformer, as described above.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

Figure 1A:
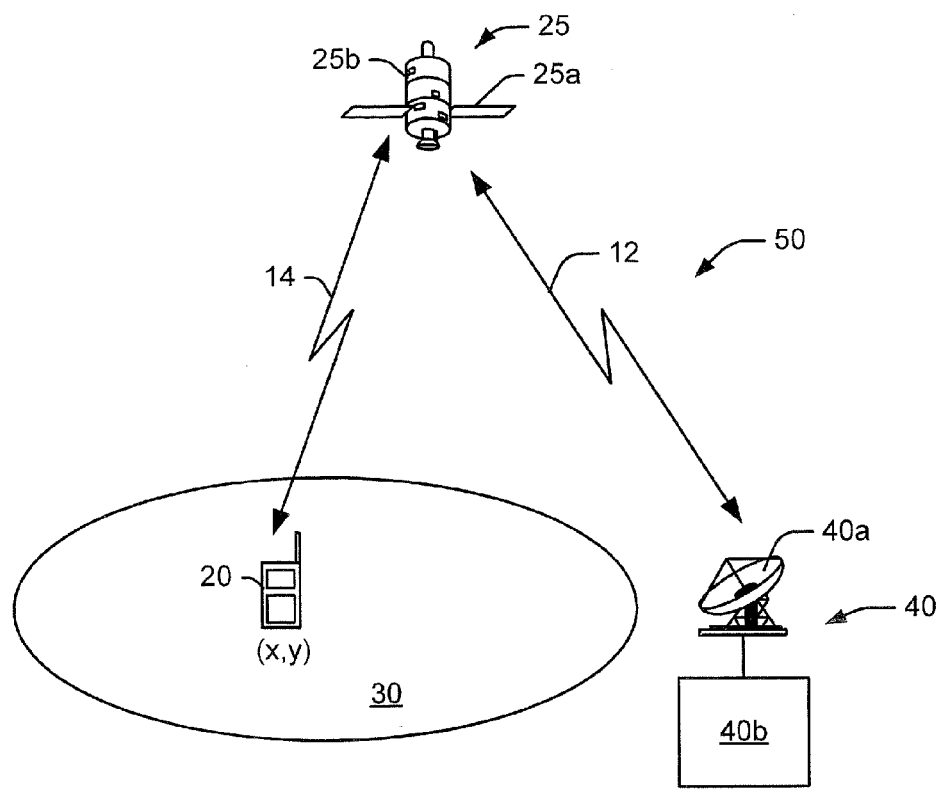
FIG. 1A is a block diagram of systems and/or methods according to embodiments of the invention.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer usable storage medium having computer usable program code embodied in the medium. Any suitable computer readable medium may be utilized including hard disks, CD ROMs, optical storage devices, a transmission media such as those supporting the Internet or an intranet, or magnetic storage devices.

The present invention is described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Moreover, as used herein, "substantially the same" band means that the bands substantially overlap, but that there may be some areas of non-overlap, for example at the band ends. "Substantially the same" air interface(s) means that the air interfaces are similar but need not be identical. Some changes may be made to one air interface (i.e., a satellite air interface) relative to another (i.e., a terrestrial air interface) to account for different characteristics that may exist between the terrestrial and satellite communications environments. For example, a different vocoder rate may be used for satellite communications compared to the vocoder rate that may be used for terrestrial communications (i.e., for terrestrial communications, voice may be compressed ("vocoded") to approximately 9 to 13 kbps, whereas for satellite communications a vocoder rate of 2 to 4 kbps, for example, may be used); a different forward error correction coding, different interleaving depth, and/or different spread-spectrum codes may also be used, for example, for satellite communications compared to the coding, interleaving depth, and/or spread spectrum codes (i.e., Walsh codes, long codes, and/or frequency hopping codes) that may be used for terrestrial communications.

Beam-forming techniques have been applied to many modern mobile satellite systems (MSS). With multiple transmitting and receiving antenna feed elements, a satellite beam-former may form a plurality of service area spot-beams (or cells) in the forward link and the reverse link by using advanced antenna array signal processing. An important goal of beam-forming is to increase the average signal to noise and/or signal to interference ratio of a link by focusing energy into desired directions in either the forward link or the reverse link. By estimating the response to each antenna element to a given user or a given location, and possible interference signals, a satellite/gateway can combine the elements with weights obtained as a function of each element response to improve the average desired signal and/or to reduce other components, such as noise, interference or both. The spot-beams may be, for example, either fixed to an area or adaptive to particular users and/or interference environments depending, for example, on application scenarios and/or design considerations.

The primary components of a satellite beam-former are a beam-forming algorithm and a calibration scheme. The accuracy of calibration may be important for the performance of a beam-forming algorithm. Different calibration approaches are typically employed on the forward link and the reverse link. The reverse link generally relies on ground calibration stations that transmit a priori known calibration signals, or on pilot signals received from users, to form spot-beams. The forward link typically uses a closed-loop beam-forming scheme that uses a number of receiving ground calibration stations. An open-loop solution for forward link satellite beam-forming has proven to be difficult to implement.

A forward link transmit beamforming scheme according to some embodiments of the invention operates in a closed-loop mode. In this mode, the system takes advantage of pilot signals that are available for modern 3G/4G standards (cdma2000, 802.16, etc.) and estimates the channels between each individual antenna feed element and CPE (Customer Premise Equipment) antenna. By using the channel estimates, the CPE is able to efficiently feed back channel estimate information though uplink control channel to satellite/gateway for adaptive closed-loop beamforming. Although described in the context of a satellite communications system, embodiments of the invention may be advantageously employed in a terrestrial communications system and/or a mixed satellite/terrestrial communications system.

Transmit schemes according to some embodiments of the invention can be applied to many different 3G/4G air interfaces, such as cdma2000, GSM, 802.16, etc. To illustrate the principles of transmit scheme according to embodiments of the invention, a CDMA air interface is considered as an application example to define a satellite forward link system model.

Each of the satellite forward link feed elements is assumed to be channeled into several frequency bands, for example, $f_1$, $f_2$ and $f_3$. The present discussion will consider a cdma2000 1× system operating in the $f_1$ band.

For a CDMA forward link, orthogonal Walsh codes are used to separate users along with an area of geo-location specific covering code. For K users receiving signals within a common geo-location area, the transmitted signal on a single feed antenna is $$y(t) = \left(\sum_{k=1}^{K} \sqrt{P_k}\, b_k(t)s_k(t) + \sqrt{P_p}\, p(t)\right) a(\theta, \varphi) q(t) \tag{1}$$

where $b_k(t)$ and $s_k(t)$ are the $k^{th}$ user's information bit and unique Walsh spreading sequence, respectively, with M chips/bit; p(t) is the Walsh code assigned to the pilot channel for the antenna, $P_k$ and $P_p$ are the transmit power to the $k^{th}$ users and transmit power of the pilot signal respectively, $a(\theta,\phi)$ is the feed antenna pattern, and q(t) is the covering code for the common geo-location area of interest.

For the $k^{th}$ user with a single antenna, the received signal is given by $$r_k(t) = \beta_k(t)y(t) + n(t) \tag{2}$$

$$= \beta_k(t)a(\theta_k, \varphi_k)\left(\sum_{k=1}^{K} \sqrt{P_k}\, b_k(t)s_k(t) + \sqrt{P_p}\, p(t)\right) q(t) + n(t)$$

$$= h_k(t)\left(\sum_{k=1}^{K} \sqrt{P_k}\, b_k(t)s_k(t) + \sqrt{P_p}\, p(t)\right) q(t) + n(t)$$

where $$\beta_k(t) = \rho_k \exp\{j(2\pi f_k t + \psi_k)\} \tag{3}$$

$\rho_k$ is the forward link path gain for the $k^{th}$ user, $f_k$ is the Doppler shift, $\psi_k$ is a fixed phase shift for the $k^{th}$ user, n(t) is thermal noise and all other interference, and $$h_k(t) = \beta_k(t)a(\theta_k, \phi_k) \tag{4}$$

is the complex satellite channel response including the transmit feed antenna pattern.

If despreading is performed on the received signal by correlating the received signal with the Walsh chip waveform after uncovering during the $i^{th}$ symbol interval of $T_s$, the decision statistic can be written as $$x_k[i] = \int_{(i-1)T_s}^{iT_s} r_k(t) q*(t) s_k(t) dt \tag{5}$$

$$= \sqrt{P_k}\, h_k[i]b_k[i] + n[i]$$

where $h_k[i]$ represents the cumulative effect of the channel response $h_k(t)$ over the $i^{th}$ symbol interval, and $b_k[i]$ is the $i^{th}$ symbol for the $k^{th}$ user.

Note that the Walsh codes assigned to different users are assumed to be orthogonal and to repeat M chips every symbol time $T_s$ to derive the decision statistic in Equation (5).

The estimate of the effective channel response $\hat{h}_k[i]$ can be obtained by using the pilot channel though integration. With the channel estimate $\hat{h}_k[i]$, the information symbol $\hat{b}_k[i]$ can be recovered by $$\hat{b}_k[i]=f(x_k[i]\hat{h}^*_k[i])$$

where $f(\cdot)$ is a decision function depending on the modulation scheme of transmitted symbol. For a coded system, $x_k[i]\hat{h}^*_k[i]$ may be used directly as a symbol metric. The above formulation is derived based on single feed element transmission and a single receive antenna for the end user. It is realistic to assume an end user has only one antenna. However, as a satellite may have many feed elements, for a given user's location, signals transmitted from at least a few of the feed elements can be received at a reasonable level at the user receiver. To achieve beamforming gain over the satellite, a transmit scheme according to some embodiments of the invention takes advantage of multiple antenna feed elements to realize beamforming gain.

In a general system model, a transmit system includes M antenna feed elements and a CPE has N receiving antennas. Then, the received signal is given by $$X=HWC+N \in C^{N \times Q} \quad (6)$$

where H is the N×M channel matrix represented by $$H = \begin{bmatrix} h_{1,1} & h_{2,1} & \cdots & h_{M,1} \\ h_{1,2} & h_{2,2} & \cdots & h_{M,2} \\ \vdots & \vdots & & \vdots \\ h_{1,N} & h_{2,N} & \cdots & h_{M,N} \end{bmatrix} \in C^{N \times M} \quad (7)$$

and is assumed constant over Q symbols, C is the M×Q transmission waveform matrix, N is the N×Q receiver noise plus interference matrix, and W is a weighting matrix with dimension of M×M.

For a satellite system, the conventional method for forming the forward link transmit path is to form a spot-beam covering a certain geo-location area by linearly combining a group of transmit feed antenna elements. All of the forward link signals may be transmitted though the formed spot-beam. The fixed spot beam-forming approach requires closed-loop calibrations that use a number of calibration stations across the coverage area. Unlike the fixed spot-beam approach, transmit schemes according to some embodiments of the invention may not require dedicated calibration stations. In the closed-loop mode, a transmit scheme according to some embodiments of the invention exploits an efficient feedback scheme from the CPE to the satellite/gateway for limited channel information to achieve near-optimal beamforming gain for less fading and/or near AWGN channel scenarios.

To limit inter-cell co-channel interference, as in the case of a spot-beam system, the transmit system may also have proper frequency planning through frequency reuse. The concept of frequency reuse among different cells (geo-location areas) can be used for the transmit system by defining virtual cells with the user location information provided by GPS. By defining virtual cells, the frequency planning can be done in a similar way as in a fixed spot system.

A system 50 according to some embodiments of the invention is illustrated in FIG. 1A. As shown therein, a CPE terminal 20 is located in a geographic cell 30 based on the geographic (x,y) coordinates of the CPE terminal 20. The geographic coordinates of the CPE terminal 20 may be determined, for example, by a GPS processor within the CPE terminal 20. The CPE terminal 20 is also located within the geographic footprint of a satellite 25, which may be a low-earth orbiting satellite (LEO), a medium-earth orbiting satellite (MEO), and/or a geostationary satellite. The satellite 25, which includes an antenna 25a and an electronics system 25b, communicates with at least one satellite gateway 40, which includes an antenna 40a and an electronics system 40b via a feeder link 12. The satellite antenna 25a may include an array of antenna feed elements (not shown), which generate signals covering respective overlapping geographic areas in the geographic footprint of the satellite 25.

The CPE terminal 20 may determine its geographic coordinates (x,y), and may transmit the geographic coordinates to the satellite gateway 40 via a return link communications channel carried by a service link 14 to the satellite 25. Based on the location of the CPE terminal 20, the satellite 25 and/or the satellite gateway 40 may determine a statistical average gain for for use in generating channel estimates for the CPE terminal 20 for use in adaptive beamforming systems and/or methods according to embodiments of the invention.

Figure 1B:
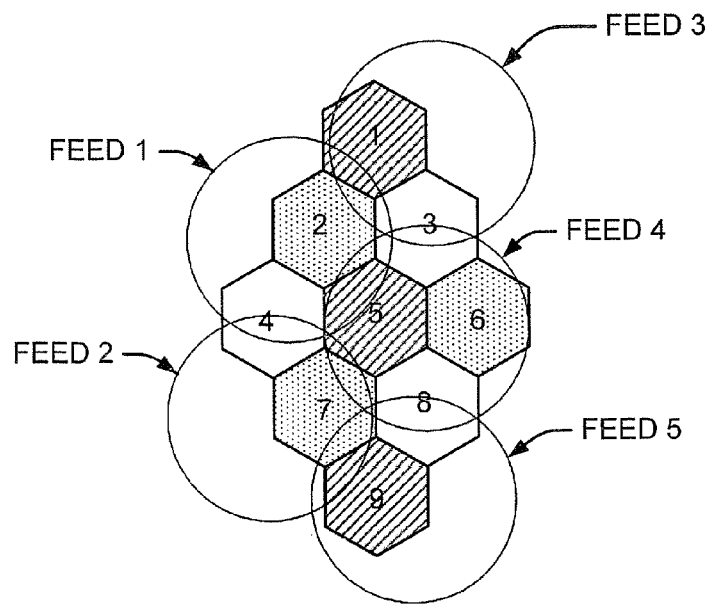
FIG. 1B is a schematic diagram illustrating a portion of a satellite antenna footprint superimposed on a plurality of frequency reuse cells in a cellular satellite transmission system.

FIG. 1B schematically illustrates an exemplary footprint of five satellite forward link feed elements that are superimposed over a virtual cell configuration, assuming a frequency reuse ratio of three, for a satellite transmit beamforming system. In FIG. 1, the idealized footprints of five antenna feed elements are transposed over nine virtual cells defined by their actual physical locations within the satellite footprint. Cells 1, 5 and 9 use a first frequency, while cells 3, 4 and 8 use a second frequency and cells 2, 6, and 7 use a third frequency.

Figure 2:
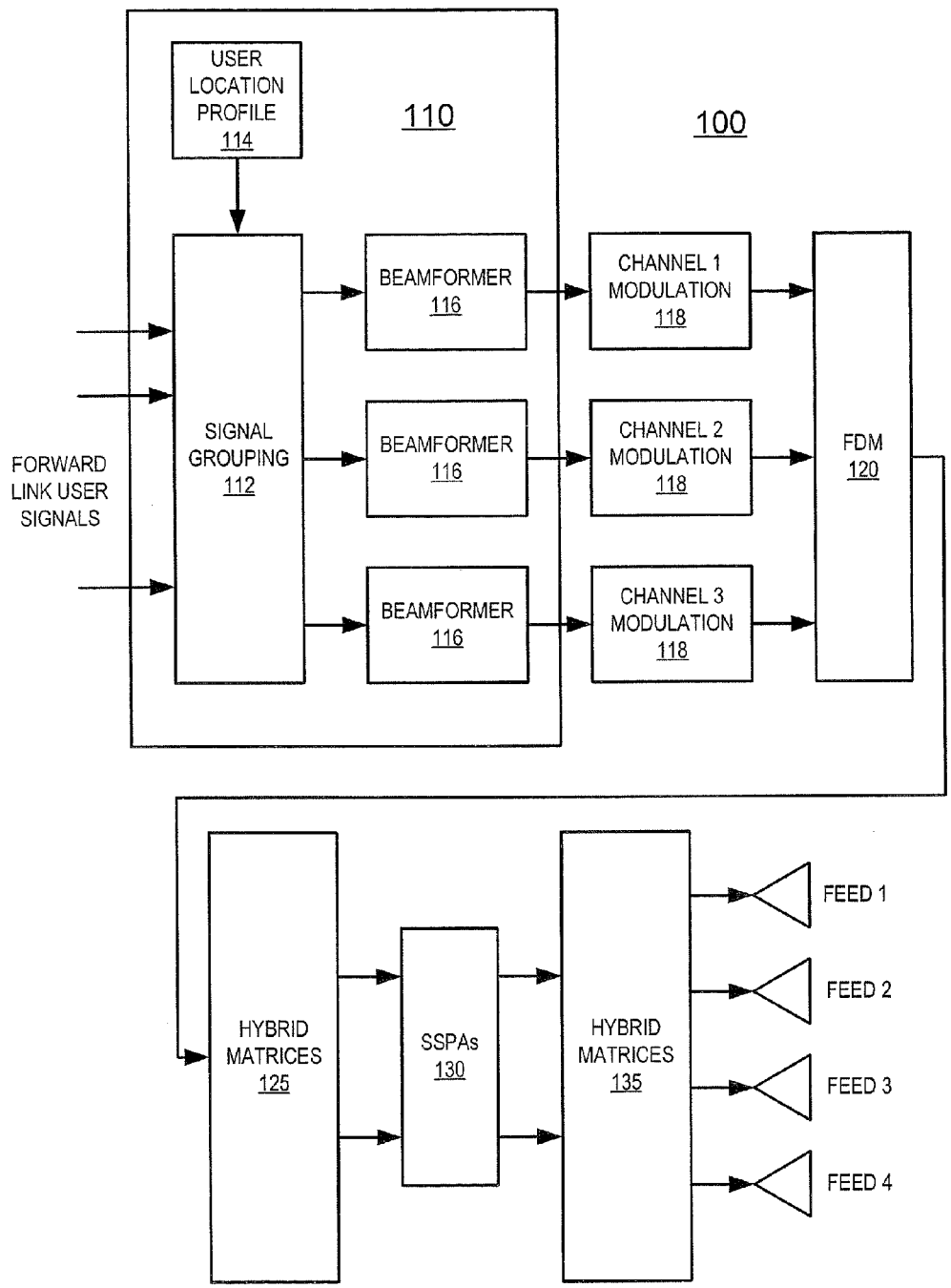
FIG. 2 is a block diagram of transmission systems and/or methods for a forward link communications system according to some embodiments of the invention.

A block diagram that illustrates a satellite forward link transmitter 100 beamforming systems and/or methods according to some embodiments of the invention is shown in FIG. 2. The transmitter 100 may be implemented, for example, in a satellite and/or in a satellite gateway.

The transmitter 100 includes a controller 110 that is configured to perform certain data processing operations on data signals that are to be transmitted by the transmitter 100. For example, the controller 110 may be configured to perform encoding, interleaving, grouping, and/or other operations. In the transmitter 100, forward link user signals are grouped into N frequency bands and are associated with subgroups of feed elements (block 112) according to the locations of the users retrieved from a user location profile database 114. Beamforming may be performed for each cell in a beamformer 116 based on quantized phase information fed back from the CPE. The formed beams are modulated by RF modulation (blocks 118 and 120) and amplified by solid state power amplifiers (SSPAs) 130, and then transmitted by each feed element Feed 1 to Feed M in parallel. In order to equalize the signal input levels applied to the individual transmit amplifiers, and therefore maintain the amplifiers within their proper signal level range, hybrid matrix amplifier configurations are commonly used onboard communication satellites. A typical hybrid matrix amplifier is comprised of a set of N (N=$2^n$, where n is an integer) parallel amplifiers located symmetrically between two, cascaded N-input by N-output multi-port hybrid matrix devices. In a typical hybrid matrix amplifier arrangement, N individual amplifier input signals are supplied by the N outputs of the N×N Input multi-port hybrid matrix 125, and the N SSPAs 130 output signals are similarly applied to the input section of the N×N Output multi-port hybrid matrix 135.

In the closed-loop operation, the satellite transmit system attempts to adaptively form a beam toward the desired user and reduce or minimize the interference (or cross talk) to other users based on the limited but important information about channel conditions provided by the CPE terminal. The closed-loop mode may be very efficient for the less-fading and/or near AWGN channel scenarios. Channel phase information is quantized and feed back to satellite/gateway though CPE terminal uplink control channel, while channel amplitude information can be approximately determined by the CPE cell location with a priori knowledge of average gains for the feeds involved with regards to a particular cell. In this mode, a CPE terminal may estimate, quantize and feed-back channel phase information to the satellite/gateway, and the satellite/gateway may form a near-optimal beam according to the approximated channel phase and/or gain information.

Theoretically, if a satellite/gateway has accurate forward link vector channel information, beamforming may be an optimal transmission strategy. However, in fading channel situations, it may be impossible for a satellite/gateway to have accurate channel information in timely manner because of large channel delays involved. When a satellite channel experiences severe Rician and/or Rayleigh fading, an open-loop mode may provide a very efficient transmission strategy by providing diversity gain. For an AWGN channel or a near-AWGN channel wherein the satellite channel is quasi-static or very slow changing, it may be possible to use CPE terminals instead of calibration stations to estimate the vector channel and to feed back certain channel information through a return link control channel at a low rate rapidly enough for a satellite/gateway to perform near-optimal user-based adaptive beamforming. Some embodiments of the invention provide efficient closed-loop adaptive beamforming.

Referring to the transmit system model defined in Equation (6) with a single receiver antenna (N=1), we set weighting matrix W as $$W = \mathrm{diag}\{w_1, w_2 \ldots w_M\} \in C^{M \times M} \quad (8)$$

and the transmission matrix C as $$C = \begin{bmatrix} c_1 & c_2 & \cdots & c_Q \\ c_1 & c_2 & \cdots & c_Q \\ \vdots & \vdots & \vdots & \vdots \\ c_1 & c_2 & \cdots & c_Q \end{bmatrix} \in C^{M \times Q} \quad (9)$$

then the received signal vector X is given by $$X = [h_{1,1} \; h_{1,2} \; \cdots \; h_{M,1}] \begin{bmatrix} w_1 & 0 & \cdots & 0 \\ 0 & w_2 & \cdots & 0 \\ \vdots & \vdots & \ddots & \vdots \\ 0 & 0 & \cdots & w_M \end{bmatrix} \begin{bmatrix} c_1 & c_2 & \cdots & c_Q \\ c_1 & c_2 & \cdots & c_Q \\ \vdots & \vdots & \vdots & \vdots \\ c_1 & c_2 & \cdots & c_Q \end{bmatrix} + n$$

$$= [h_{1,1} \; h_{2,1} \; \cdots \; h_{M,1}] \begin{bmatrix} w_1 \\ w_2 \\ \vdots \\ w_M \end{bmatrix} [c_1 \; c_2 \; \cdots \; c_Q] + n$$

$$= hwc + n \quad (10)$$

where $$h = [h_{1,1} \; h_{2,1} \ldots h_{M,1}]$$

$$w = [w_1 \; w_2 \ldots w_M]^T \quad (11)$$

$$c = [c_1 \; c_2 \ldots c_Q]$$

and $n \in C^{1 \times Q}$ is the thermal noise vector with the variance $N_0$, $\eta \sim N(0, N_0)$.

The optimum solution for the weighting vector w should be selected to maximize the SNR (signal-to-noise-ratio), which is given by $$SNR = |hw|^2 \frac{E_c}{N_o} \quad (12)$$

where $E_c = E[|c|^2]$ is signal power. The optimum weights can be found as $$\hat{w} = \mathrm{argmax} |hw|^2, \quad (13)$$

subject to the constraint $\|w\|^2 = 1$, this leads to optimum solution $$\hat{w} = \frac{h^H}{\|h\|} \quad (14)$$

where $(\bullet)^H$ stands for complex conjugate transpose.

An optimum weight can be determined based on perfect knowledge of vector channel information at the satellite/gateway. The channel vector can be estimated by the CPE terminal measuring a unique pilot signal transmitted from each feed element. The channel vector estimate can be fed back to the satellite/gateway. For example, if pilots' signals are $s_1$, $s_2$, ..., and $s_M$ for each of M feeds respectively, assuming there are Q samples of received pilot signal, the received pilots channel signal at CPE terminal can be written as $$X_s = \sqrt{\frac{\rho}{M}} hs + n \; \in C^{1 \times Q} \quad (15)$$

where $\rho$ is the total power for pilots, h is given by (27), s is the pilot matrix given by $$s = \begin{bmatrix} s_1 \\ s_2 \\ \vdots \\ s_M \end{bmatrix} \in C^{M \times Q} \quad (16)$$

and $n \in C^{1 \times Q}$ is the thermal noise vector. The channel estimate can be obtained by $$\hat{h} = \sqrt{\frac{M}{\rho}} X_s S^H (SS^H)^{-1} \quad (17)$$

To feed back complete channel information would require a large throughput for the CPE terminal in the return link, which may compromise the traffic channel capacity. Accordingly, some embodiments of the invention provide an efficient user-based adaptive beamforming method with limited vector channel feedback.

Vector channel information includes both gain and phase information. Between these, the vector channel phase information may be more important for beamforming, since channel phase information alone may allow co-phasing the signals transmitted from different feeds, such that all signal paths may be added coherently together when they reach the CPE antenna. First, a simple, efficient way to send the vector channel estimates back to satellite/gateway is provided. The objective is to have limited feedback so as not to exceed the limited return control channel capacity, and at the same time, not to compromise much beamforming performance. To limit the feedback rate, the vector channel phase information is quantized. For example, in one such embodiment, a 2 bit quantization may be used for each feed element. The input of the phase quantizer is the phase vector of the channel, which is given by $$\phi = [\angle h_{2,1} - \angle h_{1,1} \angle h_{3,1} - \angle h_{1,1} \ldots \angle h_{M,1} - \angle h_{1,1}]^T \epsilon^{(M-1)\times 1} \quad (18)$$

where $\angle(\bullet)$ stands for phase.

The output of the phase quantizer is $$P_Q = [[I_1 \ Q_1], [I_2 \ Q_2], \ldots, [I_{M-1} \ Q_{M-1}]] \quad (19)$$

where $I_m = \{0,1\}$ and $Q_m = \{0,1\}$, m=1, 2, ... M−1, with 0 and 1 representing the phases in $I_m$ and $Q_m$ defined as Table 3

TABLE 3

$I_m$ and $Q_m$ Definitions

|  | 0 | 1 |
|---|---|---|
| $I_m$ | π | 0 |
| $Q_m$ | −π/2 | π/2 |

Figure 3A:
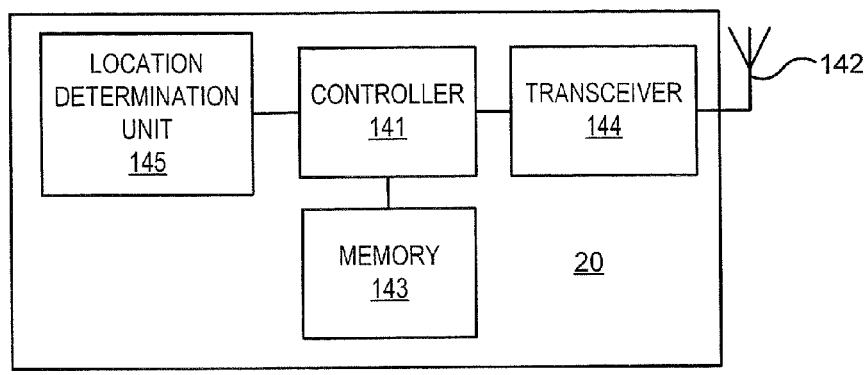
FIGS. 3A and 3B are block diagrams of receiver systems and/or methods according to some embodiments of the invention.

A block diagram of a CPE terminal 20 is shown in FIG. 3A. As shown therein, a CPE terminal 20 may include a controller 141 configured to control operations of the CPE terminal 20. A memory 143 and a transceiver 144 are connected to the controller 141. The transceiver 144 is configured to transmit/receive RF signals using one or more wireless communications protocols as described above via an antenna 142. The CPE terminal 20 also includes a location determination unit 145, which is configured to determine a geographic location of the CPE terminal 20. The location determination unit 145 may include, for example, a global positioning system (GPS) receiver.

Figure 3B:
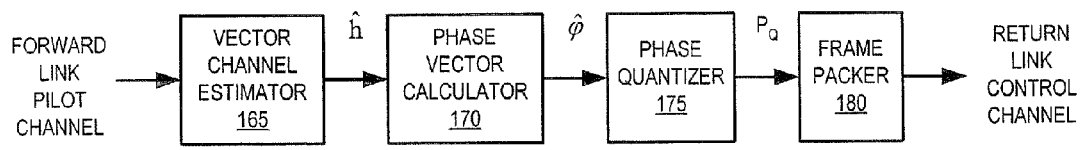

A block diagram for vector channel phase information processing and feedback at the CPE terminal is shown in FIG. 3B. As shown therein, a CPE terminal 20 includes a vector channel estimator 165, a phase vector calculator 170, a phase quantizer 180 and a frame packer 180. The vector channel estimator 165, the phase vector calculator 170, the phase quantizer 180 and/or the frame packer 180 may be implemented, for example, as modules in the memory 143 of the CPE terminal 20. The vector channel estimator 165 receives known forward link pilot channel signals from a transmitter, such as a satellite, and uses the pilot channel signals to generate channel estimates, which include gain and phase information for each of the channels.

Figure 4:
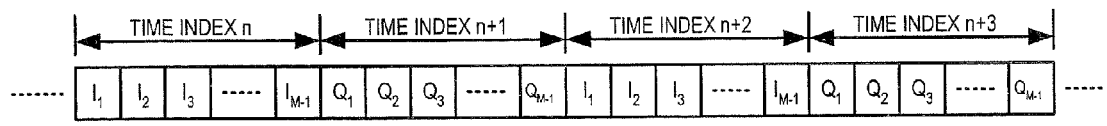
FIG. 4 is a schematic illustration of frames on a return link control channel according to some embodiments of the invention.

The forward link pilot channel contains known pilot signals, which are uniquely related to individual feed elements through code division and/or time division. By processing the received forward link pilot signal, the vector channel estimator 165 of the CPE terminal estimates the vector channel. The vector channel phase information $\hat{\phi}$ is extracted by the phase vector calculator 170 and quantized by the phase vector quantizer 175 to form the quantized phase estimates $P_Q$. The quantized phase information then is assembled by the frame packer 180 according to a frame structure, and sent through return link control channel to the satellite/gateway. FIG. 4 shows a channel information feedback frame structure for embodiments with 2 bits/feed element with M feeds elements. As shown in FIG. 4, in each time index n, a frame may include M estimates of in-phase estimates I and M quadrature estimates Q. In the frame structure shown in FIG. 4, the M in-phase estimates I for the M feed elements are sent, and then the M quadrature estimates Q for the M feed elements are sent.

At the satellite/gateway, the received vector channel phase information is converted to a data stream $\hat{\theta}_{n,m}$ with time index n for every updating:

$$\hat{\theta}_{n,m} = \begin{cases} I_m, & n = \text{even index} \\ Q_m, & n = \text{odd index} \end{cases} m = 1, 2, \ldots, M-1 \quad (20)$$

Thus, a single updating period n may only include I or Q values, but not both.

From the data stream $\hat{\theta}_{n,m}$, the vector channel phase information can be constructed linearly from the two most recent phase information updates, including one from an even time index (I slot) and one from an odd time index (Q slot), e.g., $$\hat{\phi}_{n,m} = \frac{1}{2}(e^{j\hat{\theta}_{n,m}} + e^{j\hat{\theta}_{n-1,m}}) \ m = 1, 2, \ldots, M-1 \quad (21)$$

By considering the first feed as the reference feed and omitting the time index n, the channel phase vector can be written as $$\hat{\phi} = [1 \ \hat{\phi}_2 \ldots \hat{\phi}_M]^T \epsilon C^{M \times 1} \quad (22)$$

The gain information may not be as important as the phase information. However, for a given cell located at certain geographic area, there are only certain numbers of feed elements visible to users in the cell. The contribution from each of the feed elements may depend on the gain of each feed element, which may be unbalanced from one to another due to typical feed patterns. Thus, it may be beneficial for the beamformer to distribute the total signal power among feed elements proportionally according to feed gain contribution for a given cell. Fortunately, a satellite/gateway may have good knowledge about the feed gains with regard to a given cell, even though feed patterns may vary from time to time. In some embodiments, statistical average feed gain data may be used with regard to a given cell. For a given cell, by looking up the average feed gain data from a feed gain database, the feed gain vector for the largest M feeds can be formed as $$G = [g_1 \ g_2 \ldots g_M]^T \epsilon R^{M \times 1} \quad (23)$$

With the phase and gain information obtained from Equations (22) and (23) respectively, the down link vector channel can be constructed as $$\hat{h} = \hat{\phi} \circ G \ \epsilon C^{M \times 1} \quad (24)$$

where $\circ$ denotes element by element product. For the beamformer defined by Equation (13), the resulting weights or excitation coefficients are given by $$\hat{W} = \frac{1}{\sqrt{g_1^2 + g_2^2 + \ldots + g_M^2}} [g_1 \ g_2 \hat{\phi}_2^* \ g_3 \hat{\phi}_3^* \ \cdots \ g_M \hat{\phi}_M^*]^T \quad (25)$$

Figure 5:
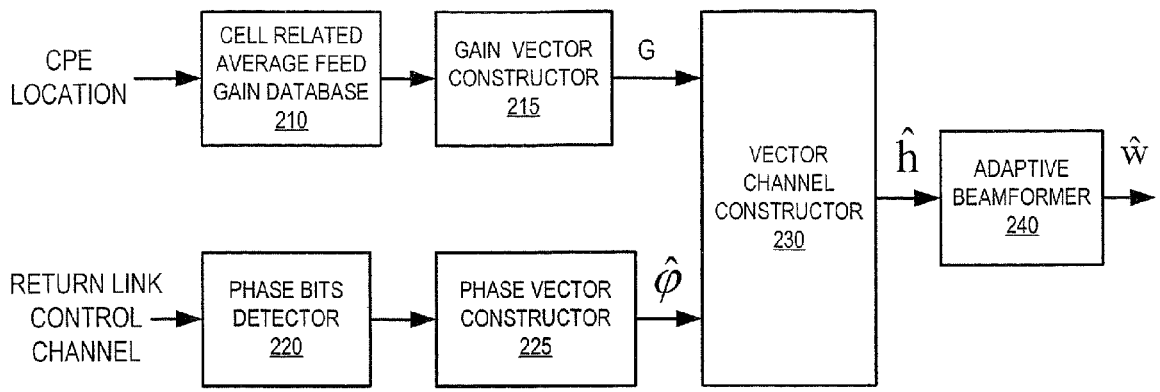
FIG. 5 is a block diagram of beamforming systems and/or methods according to some embodiments of the invention.

FIG. 5 illustrates systems and/or methods for closed-loop forward link beamforming processing at a satellite/gateway. In particular, a satellite/gateway that is configured to perform adaptive beamforming according to some embodiments of the invention includes a cell-related average feed gain database 210, a gain vector constructor 215, a phase bits detector 220, a phase vector constructor 225, a vector channel constructor 230, and an adaptive beamformer 240.

The phase bits detector 220 receives quantized phase information over the return link control channel. The received phase bits are used by a phase vector constructor 225 to build a phase vector $\hat{\phi}$.

Gain estimates for the CPE terminal may be obtained by determining the CPE terminal location, which can be provided by the CPE terminal itself. The CPE terminal location is used to determine a gain estimate by reference to an average feed gain database 210 for the cell in which the CPE terminal is located. The determined gain information for each feed element is used by the gain vector constructor 215 to build a gain vector G. The gain vector G and the phase vector $\hat{\phi}$ are used by the vector channel constructor 230 to form a downlink vector channel estimate $\hat{h}$ according to Equation (24). The adaptive beamformer 240 then generates beamforming weights $\hat{w}$ according to Equation (25).

With the excitation coefficients, the weighted signal may arrive at the CPE antennas in co-phase. Thus, all signal paths may combine coherently to achieve beamforming gain. Since the first feed is used as phase reference, the received signal only needs to include phase rotation information relative to the phase estimate of the first (reference) feed.

In some situations, it may be possible to have several CPE terminals operating at the same time. The satellite/gateway may have vector channel information from different CPE terminals that are in different locations. Therefore, the satellite/gateway can take advantage of this channel information to reduce or minimize the inter-user interference when forming a beam to a desired user. Assuming there are total of K CPE terminals, and the reconstructed channel information related to these K terminals are $\hat{h}_1, \hat{h}_2, \ldots,$ and $\hat{h}_K$ (assuming each vector is a column vector), respectively, a beam may be formed that has increased (e.g. unity) response in the direction of the desired user (assuming the first user), and null responses in the directions of other CPE terminals. (As used herein, a null response corresponds to a spatial region of reduced frequency response. Thus, it will be appreciated that a null response may exist in the direction of a CPE terminal even if the response in the direction of the CPE is not zero.) Thus, it is desired to have a weight vector that is subject to following constraints:

$$\begin{cases} w^H \hat{h}_1 = 1 \\ w^H \hat{h}_k = 0, k = 2, \ldots, K \\ \|w\|^2 = 1 \end{cases} \quad (26)$$

By forming a matrix B whose columns are the channel vectors associated with the desired user and other CPE terminals $$B = [\hat{h}_1, \hat{h}_2, \ldots, \hat{h}_K] \in C^{M \times K} \quad (27)$$

we can rewrite the above constraint equations as $$\begin{cases} w^H B = i_1^T \\ \|w\|^2 = 1 \end{cases} \quad (28)$$

where $$i_1 = [1, 0, \ldots, 0]^T \in I^{K \times 1} \quad (29)$$

To ensure the array has enough degrees of freedom to form K−1 nulls would require K≦M. A general form of solution for the estimate of weighting vector may be given by $$w^H = \frac{\tilde{w}^H}{\|\tilde{w}\|} \quad (30)$$

where $$\tilde{w}^H = i_1^T (B^H B)^{-1} B^H \in C^{1 \times M} \quad (31)$$

and the term $(B^H B)^{-1} B^H$ is the pseudo inverse of matrix B.

Figure 6:
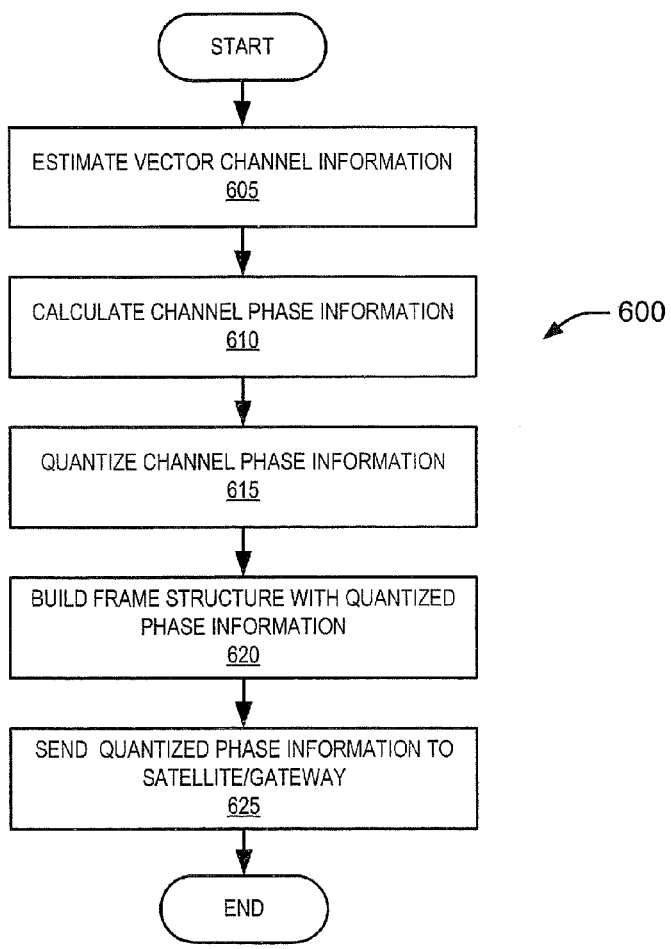
FIG. 6 is a flowchart illustrating operations that may be performed at a CPE terminal according to some embodiments of the invention.
Figure 7:
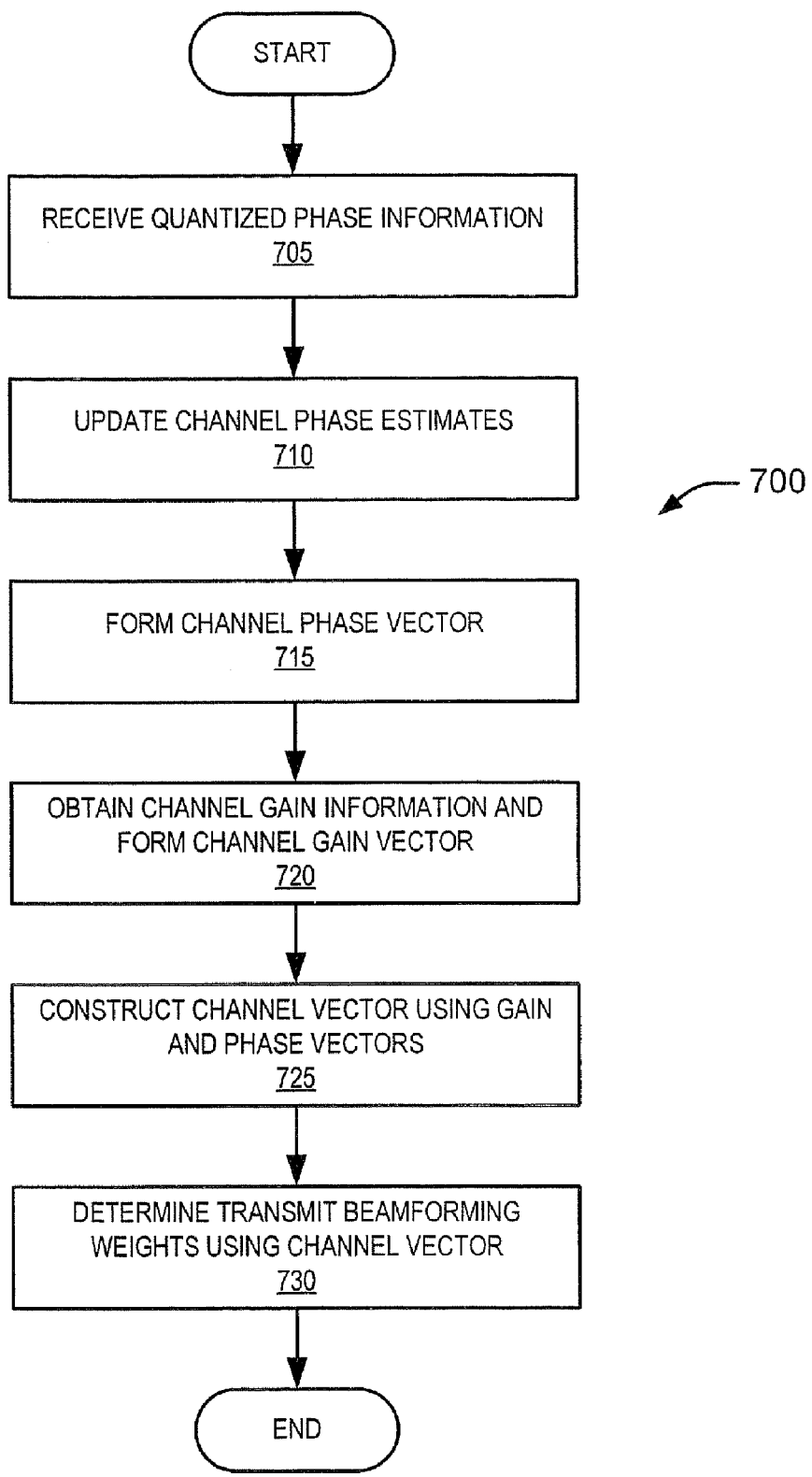
FIG. 7 is a flowchart illustrating operations that may be performed at a satellite/gateway according to some embodiments of the invention.

Based on the foregoing description, satellite forward link beamforming based on limited closed-loop feedback information may include the operations shown in FIGS. 6 and 7. In particular, FIG. 6 illustrates operations 600 that may be performed at a CPE terminal, while FIG. 7 illustrates operations 700 that may be performed at a satellite/gateway.

Referring to FIG. 6, operations 600 begin with the CPE terminal estimating channel information for each of the feed elements to provide a vector of channel information (Block 605). The vector channel information may be estimated, for example, using Equation (17) at each CPE terminal. The vector channel phase information is then calculated, for example, as provided in Equation (18) (Block 610).

Next, the vector channel phase information is quantized (Block 615). For example, the vector channel phase information may be quantized according to the format and definition given by Equation (19) and Table 3. The quantized vector channel information may be packed into a frame structure such as the structure defined in FIG. 4 (Block 620). The quantized vector channel phase information frame is then sent through a return link control channel to the satellite/gateway (Block 625).

Referring to FIG. 7, operations 700 that may be performed at a satellite/gateway are illustrated. The quantized phase information is received from the CPE terminal over a return link control channel (Block 705). The received vector channel phase information is then converted into a phase data stream with time index n for every update period, according to Equations (20-21) (Block 710). Next, a channel phase vector is formed for every update period, for example, using Equation (22) (Block 715).

The vector channel gain information in Equation (23) is then obtained by looking up the values in a data base that contains average gains for each feed element based on the cell in which the CPE terminal is located (Block 720).

A vector channel including both gain and phase information may then be constructed, for example, using Equation (24) (Block 725). Finally, the transmit beamforming weights are determined based on the vector channel. For a single user, the beamforming weights may be determined according to Equation (25) if only one vector channel is available. If multiple vector channels are available, the transmit beamforming weights may be determined for the desired user according to Equations (30-31).

The performance of a satellite transmit system according to some embodiments of the invention is evaluated with computer simulations. In order to compare performance of transmission schemes according to embodiments of the invention with that of fixed spot beamforming, satellite transmission feed element gain and phase data, as well as the formed fixed spot beam data provided by a major satellite manufacturer is used. The forward transmit system is considered to have 4/8/12 feeds and 1 receive antenna in the closed-loop mode.

For fixed spot beamforming, which is not dependent on the user waveform, the forward transmit system uses 62 feeds and 1 receive antenna.

To provide a fair comparison among different transmission schemes, fixed spot beamforming is used as a benchmark, i.e., all involved feed element gains are accordingly scaled with the peak gain of the fixed spot-beam being scaled to 1 (0 dB). The large scale propagation channel path loss is assumed to be 0 dB. The satellite channel is assumed to be a Rician distributed fading channel with a line-of-sight (LOS) component plus independent fading components from each transmit feed to the receive antenna. The Rician K-factor is defined as the ratio of the LOS component and the fading components. The total transmit power (at the output of the hybrid matrices) is further assumed to be constrained to unity for all transmit schemes under consideration. In other words, the total transmit power is set to be the same, no matter which transmit scheme is used or how many feed elements are used. In all simulations, $E_b/N_0$ is defined as the received signal-to-noise ratio at the bema center for the fixed spot-beam scheme.

Figure 8:
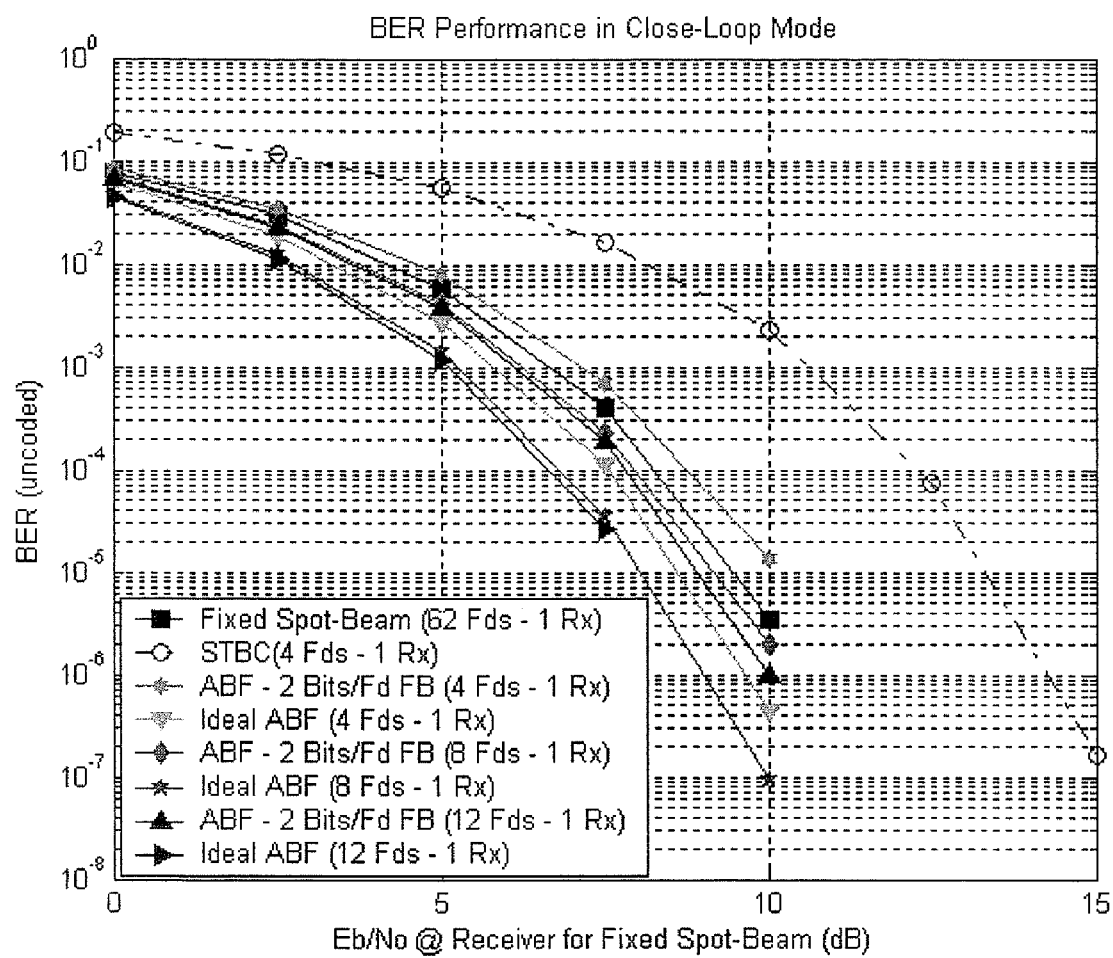
FIGS. 8, 9A, 9B, 10A and 10B are graphs of simulation results showing simulated performance of closed-loop communications systems and/or methods according to some embodiments of the invention.

FIG. 8, which is a graph of simulated bit error rate (BER) versus energy per bit ($E_b/N_0$), shows the performance of the proposed close-loop mode satellite forward link transmit scheme with limited feedback. The simulations are based on a satellite channel where a strong line of sight component exists between the satellite and the CPE with K-factor=30 dB. The simulations consider a closed-loop adaptive beamforming (ABF) transmit scheme with low rate (2 bits per feed) feedback for quantized vector channel phase information. The results include 4 transmit feeds, 8 transmit feeds and 12 transmit feeds using the corresponding numbers of most significant feeds among the 62 transmit feed elements. Fixed spot-beam performance information provided by a satellite equipment manufacturer is used as a benchmark for comparison. The lower bound of performance is based on ideal adaptive beamforming where the perfect forward link vector channel information is presumed available to the satellite/gateway. The results for an open-loop mode space-time block coding (STBC) scheme are also shown for comparison.

It appears from FIG. 8 that in less fading or near-AWGN channel scenarios, the closed-loop mode may have an advantage over an open-loop solution based on space-time block coding. This may be due to the fact that the closed-loop mode beamforming provides beamforming gain through pre-weighting while an open-loop space-time block coding mode provides diversity gain. With limited transmit power and a near AWGN channel, there may be no diversity gain for an open-loop mode. It can also be seen that increasing the number of feed for adaptive beamforming may improve the performance. The performance improvement, for example, is about 1 dB from 4 feeds to 8 feeds, and is a small fractional dB from 8 feeds to 12 feeds. The 8 feeds closed-loop mode adaptive beamforming with limited feedback outperforms the fixed spot beam using 62 feeds.

Another interesting comparison is the comparison between the ideal ABF and ABF with limited feedback to see how much performance loss is suffered by approximating the vector channel information as described above. As shown in FIG. 8, a closed-loop ABF scheme according to some embodiments of the invention may have about 1 to 1.2 dB loss compared with ideal ABF.

Figure 9A:
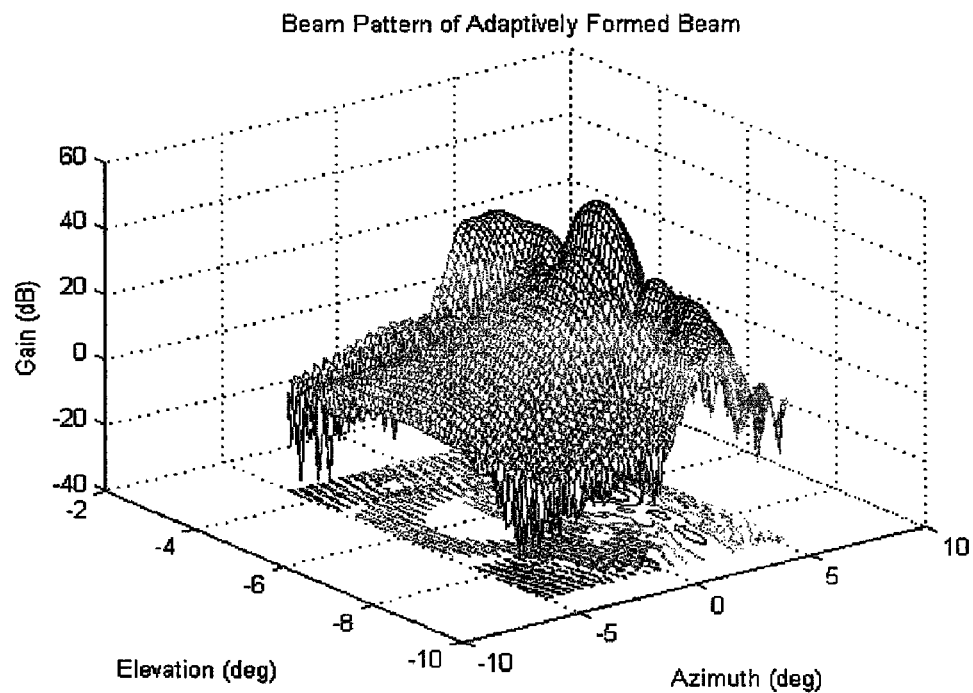
Figure 9B:
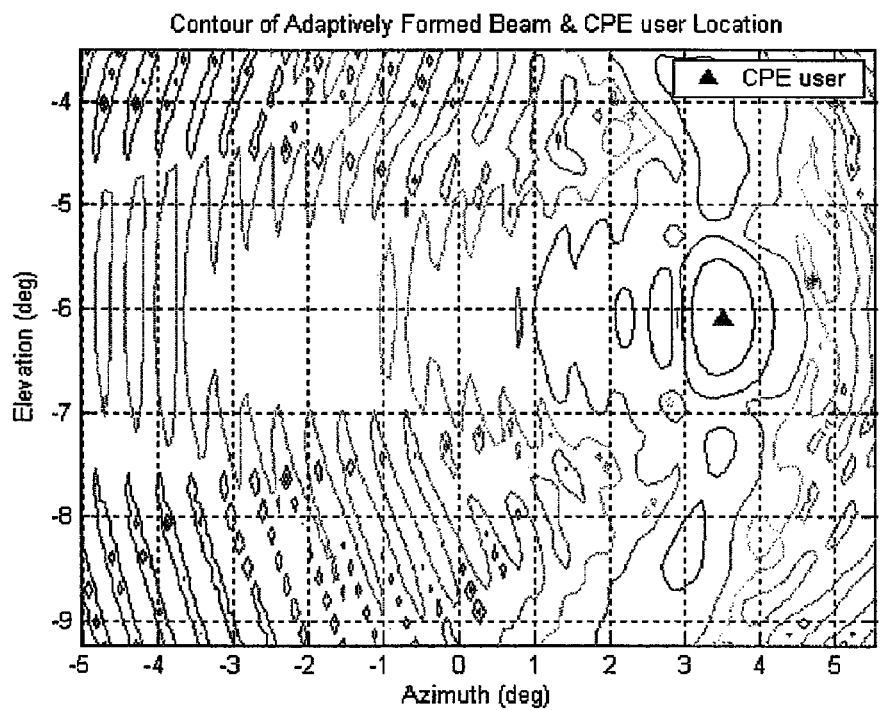

Next, a beam pattern generated by closed-loop ABF with limited feedback is examined. The adaptive beamforming weights can be determined by either Equation (25) (Algorithm I) for a single user or Equations (30-31) (Algorithm II) for multiple users. FIG. 9A is a three-dimensional graph of the adaptively formed beam pattern based on Algorithm I when only the desired user's the vector channel information can be constructed based on limited channel feedback. The corresponding contour plots and the user's location are shown in FIG. 9B where each contour ring represents a 10 dB of reduction from the very next inner contour. It appears a peak is formed toward to the desired user, and the beam pattern is in good shape given the fact that only limited phase information is fed back to the satellite/gateway.

Figure 10A:
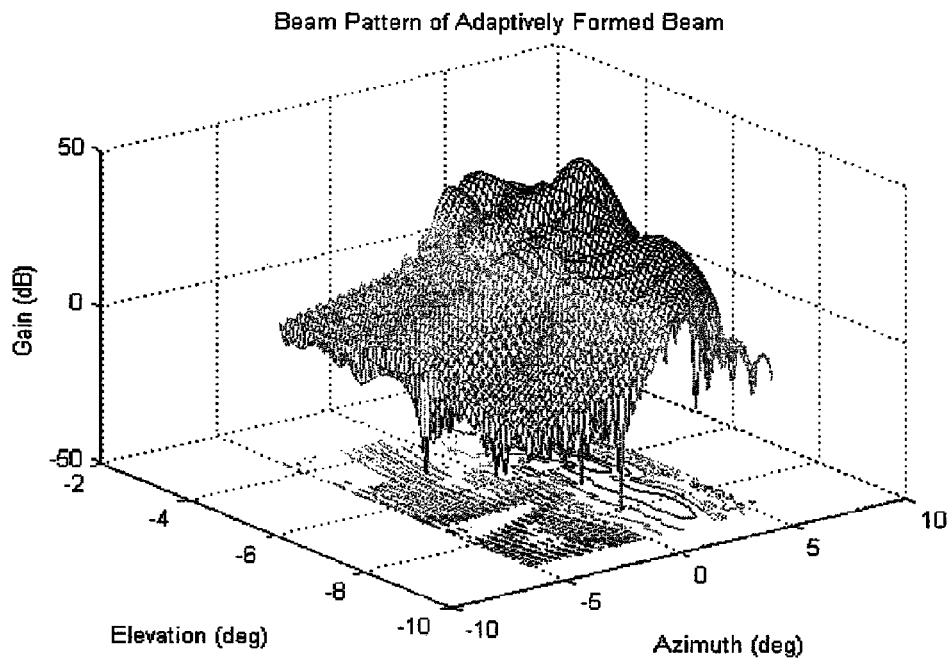
Figure 10B:
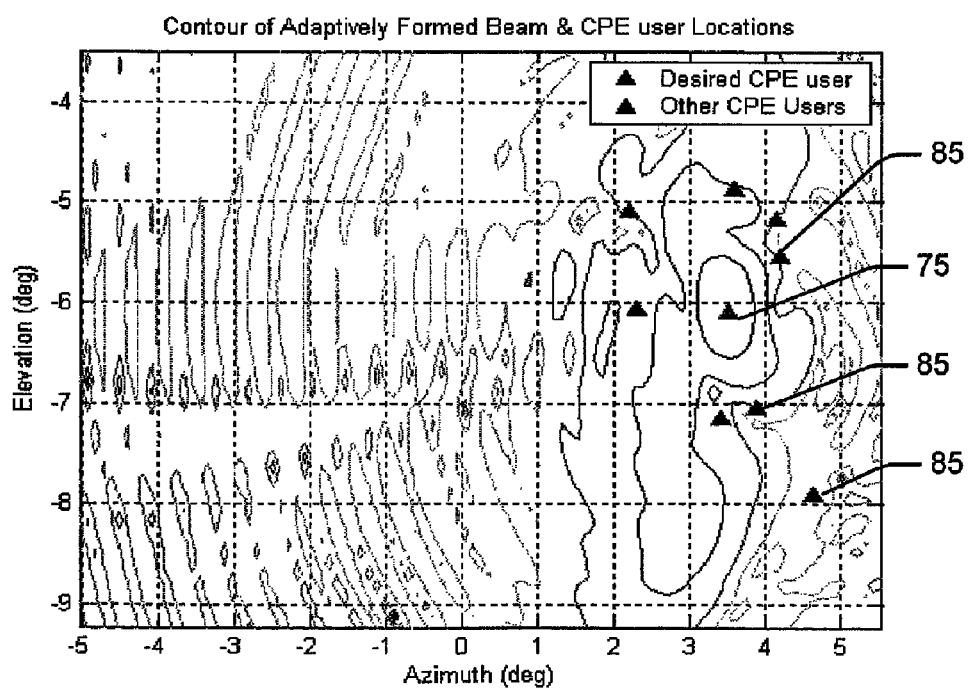

If multiple users send back quantized vector phase information, multiple vector channel information can be constructed. In this case, the satellite/gateway can jointly and adaptively form a beam for each of the users to minimize the inter-user interference by using Algorithm II. FIG. 10A shows the ABF pattern for the desired users from Algorithm II if a group of multiple users (whose locations are randomly generated) send back their respective quantized vector phase information. The corresponding contours and multiple CPE users' locations are shown in FIG. 10B. It can be seen from FIG. 10B that while forming a peak toward the desired user 75, the beamformer is generating a null toward other users 85. The peak may increase the desired signal to the user, and nulls may reduce inter-user interference. Thus, this per user based adaptive beamforming approach may increase the signal to interference and/or noise ratios at each CPE terminal.

Methods and system architectures for closed-loop satellite forward link transmission are described. For closed-loop operation, new, very efficient and robust CPE feed back schemes and methods are described. The feedback schemes and methods described herein can provide better performance than a fixed spot beam approach with little degradation compared to ideal adaptive beamforming. Closed-loop operation may be especially useful in less fading or near-AWGN channel scenarios, in which open-loop beamforming may not be effective.

Some embodiments of the invention provide methods of forming a satellite forward service link beam including, in a closed loop mode, quantizing certain channel information and feeding the quantized information back to the transmitter. Embodiments of the invention provide systems and apparatus, including satellites/gateways and associated devices, configured to perform closed loop forward service link transmission.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method of communicating information between a wireless terminal and a transmitter including an antenna having a plurality of antenna feed elements, comprising:
generating channel estimates for a plurality of channels at the wireless terminal from the plurality of antenna feed elements;
obtaining channel phase information from the channel estimates;
quantizing the channel phase information using a 2-bit quantization for each channel to obtain quantized channel phase values; and
transmitting the quantized channel phase values to the transmitter.

2. The method of claim 1, wherein the quantized channel phase values comprise in-phase (I) and quadrature (Q) quantized channel phase values for the plurality of channels from each of the plurality of antenna feed elements to the wireless terminal, the method further comprising:

constructing a frame structure including the in-phase (I) and quadrature (Q) quantized channel phase values for each of the plurality of channels;
wherein transmitting the quantized channel phase values comprises transmitting the frame structure on a return link control channel.

3. The method of claim 2, wherein the frame structure comprises M number of in-phase (I) quantized channel phase values and M number of quadrature (Q) quantized channel phase values corresponding to M of the plurality of antenna feed elements.

4. The method of claim 3, wherein the frame structure comprises the M number of in-phase (I) quantized channel phase values followed by the M number of quadrature (Q) quantized channel phase values.

5. The method of claim 1, wherein the channel phase information comprises in-phase (I) and quadrature (Q) phase information for the plurality of channels from each of the plurality of antenna feed elements to the wireless terminal, and wherein quantizing the channel phase information comprises quantizing the in-phase (I) phase information with a first bit and quantizing the quadrature (Q) phase information with a second bit.

6. The method of claim 5, wherein quantizing the channel phase information comprises quantizing the in-phase (I) phase information as π or 0 and quantizing the quadrature (Q) phase information as π/2 or −π/2.

7. The method of claim 1, further comprising:
determining a geographic location of the wireless terminal; and
transmitting the determined geographic location to the transmitter.

8. The method of claim 1, further comprising:
receiving the quantized channel phase values at the transmitter;
obtaining channel gain estimates for each of the plurality of antenna feed elements;
constructing the channel estimates for the plurality of channels using the quantized channel phase values and the channel gain estimates; and
determining transmit beamforming weights in response to the constructed channel estimates.

9. The method of claim 8, wherein receiving the quantized channel phase values comprises receiving a frame structure including the quantized channel phase values for M number of the plurality of channels, wherein the frame structure includes M number of in-phase (I) quantized channel phase values followed by M number of quadrature (Q) quantized channel phase values.

10. The method of claim 9, further comprising:
generating a channel phase estimate for an mth channel of the M number of the plurality of channels in response to an in-phase (I) quantized channel phase value and a quadrature (Q) quantized channel phase value for the mth channel, wherein constructing the channel estimates comprises constructing a channel estimate for the mth channel using the channel phase estimate and a channel gain estimate for the mth channel.

11. The method of claim 10, further comprising:
updating the channel phase estimate for the mth channel upon receipt of a most recently received one of the in-phase (I) quantized phase value for the mth channel and the quadrature (Q) quantized phase value for the mth channel.

12. The method of claim 11, wherein updating the channel phase estimate for the mth channel comprises updating the channel phase estimate for the mth channel according to the following equation:

$$\hat{\phi}_{n,m} = \frac{1}{2}\left(e^{j\hat{\theta}_{n,m}} + e^{j\hat{\theta}_{n-1,m}}\right)$$

where $\hat{\theta}_{n,m}$ is the in-phase (I) or quadrature (Q) quantized channel phase value for the mth channel received in an nth time index.

13. The method of claim 8, wherein obtaining the channel gain estimates comprises obtaining an average feed gain value from a feed gain database in response to a location of the wireless terminal.

14. The method of claim 13, further comprising receiving an indication of the location of the wireless terminal from the wireless terminal.

15. The method of claim 8, wherein determining the transmit beamforming weights in response to the constructed channel estimates comprises determining the transmit beamforming weights that generate an increased response in a direction of the wireless terminal.

16. The method of claim 8, wherein determining the transmit beamforming weights comprises determining the transmit beamforming weights that generate a null response in a direction of another wireless terminal.

17. A transmitter for use in a wireless communications system, comprising:
a plurality of antenna feed elements;
a phase bits detector configured to receive quantized channel phase values;
a phase vector constructor configured to generate a vector of channel phase estimates for a plurality of channels from the plurality of antenna feed elements to a wireless terminal in response to the quantized channel phase values;
a gain vector constructor configured to generate a vector of channel gain estimates for the plurality of channels;
a vector channel constructor configured to generate a vector of channel estimates for the plurality of channels in response to the vector of channel phase estimates and the vector of channel gain estimates; and
an adaptive beamformer configured to generate a vector of transmit beamforming weights in response to the vector of channel estimates.

18. The transmitter of claim 17, wherein the phase bits detector is further configured to receive a frame structure over a return link control channel, the frame structure including the quantized channel phase values for M number of the plurality of channels, wherein the frame structure includes M number of in-phase (I) quantized channel phase values followed by M number of quadrature (Q) quantized channel phase values.

19. The transmitter of claim 18, wherein the phase vector constructor is further configured to generate a channel phase estimate for an mth channel of the M number of the plurality of channels in response to an in-phase (I) quantized channel phase value and a quadrature (Q) quantized channel phase value for the mth channel; and
wherein the vector channel constructor is further configured to construct a channel estimate for the mth channel using the channel phase estimate for the mth channel and a channel gain estimate for the mth channel.

20. The transmitter of claim 19, wherein the phase vector constructor is further configured to update the channel phase estimate for the mth channel upon receipt of a most recently received one of the in-phase (I) quantized channel phase value for the mth channel and the quadrature (Q) quantized channel phase value for the mth channel.

21. The transmitter of claim 20, wherein the phase vector constructor is further configured to update the channel phase estimate for the mth channel according to the following equation:

$$\hat{\phi}_{n,m} = \frac{1}{2}\left(e^{j\hat{\theta}_{n,m}} + e^{j\hat{\theta}_{n-1,m}}\right)$$

where $\hat{\theta}_{n,m}$ is the in-phase (I) or quadrature (Q) quantized channel phase value for the mth channel received in an nth time index.

22. The transmitter of claim 17, further comprising a feed gain database containing average feed gain information, wherein the gain vector constructor is further configured to obtain the channel gain estimates by obtaining an average feed gain value from the feed gain database in response to a location of the wireless terminal, 23. The transmitter of claim 22, wherein the gain vector constructor is further configured to receive an indication of the location of the wireless terminal from the wireless terminal.

24. The transmitter of claim 17, wherein the adaptive beamformer is further configured to determine the transmit beamforming weights that generate an increased response in a direction of the wireless terminal.

25. The transmitter of claim 17, wherein the adaptive beamformer is further configured to determine the transmit beamforming weights that generate a null response in a direction of another wireless terminal.

26. A wireless terminal for use in a communications system, comprising:
   a vector channel estimator configured to generate channel estimates for a plurality of channels at the wireless terminal from a plurality of antenna feed elements at a remote transmitter;
   a phase vector calculator configured to obtain channel phase information from the channel estimates; and
   a phase quantizer configured to quantize the channel phase information using a 2-bit quantization for each channel to obtain quantized channel phase values.

27. The wireless terminal of claim 26, wherein the quantized channel phase values comprise in-phase (I) and quadrature (Q) quantized channel phase values for the plurality of channels from each of the plurality of antenna feed elements to the wireless terminal; and
   wherein the wireless terminal further comprises a frame packer configured to construct a frame structure including the in-phase (I) and quadrature (Q) quantized channel phase values for each of the plurality of channels.

28. The wireless terminal of claim 27, wherein the frame structure comprises M number of in-phase (I) quantized channel phase values and M number of quadrature (Q) quantized channel phase values corresponding to M of the antenna feed elements.

29. The wireless terminal of claim 28, wherein the frame structure comprises the M number of in-phase (I) quantized channel phase values followed by the M number of quadrature (Q) quantized channel phase values.

30. The wireless terminal of claim 26, wherein the channel phase information comprises in-phase (I) and quadrature (Q) phase information for the plurality of channels from each of the plurality of antenna feed elements to the wireless terminal, and wherein the phase quantizer is further configured to quantize the in-phase (I) phase information with a first bit and the quadrature (Q) phase information with a second bit.

31. The wireless terminal of claim 30, wherein the phase quantizer is further configured to quantize the in-phase (I) phase information as $\pi$ or 0 and to quantize the quadrature (Q) phase information as $\pi/2$ or $-\pi/2$.

32. The wireless terminal of claim 26, further comprising:
   a location determination unit configured to determine a geographic location of the wireless terminal.

33. A communications system, comprising:
   (a) a wireless terminal comprising:
   a vector channel estimator configured to generate channel estimates for a plurality of channels at the wireless terminal from a plurality of antenna feed elements;
   a phase vector calculator configured to obtain channel phase information from the channel estimates;
   a phase quantizer configured to quantize the channel phase information to obtain quantized channel phase values; and
   a transceiver configured to transmit the quantized channel phase values; and
   (b) a transmitter, comprising:
   the plurality of antenna feed elements;
   a phase bits detector configured to receive the quantized channel phase values from the wireless terminal;
   a phase vector constructor configured to generate a vector of channel phase estimates for the plurality of channels in response to the quantized channel phase values, wherein the plurality of channels comprise channels from the plurality of antenna feed elements to the wireless terminal;
   a gain vector constructor configured to generate a vector of channel gain estimates for the plurality of channels;
   a vector channel constructor configured to generate a vector of channel estimates for the plurality of channels in response to the vector of channel phase estimates and the vector of channel gain estimates; and
   an adaptive beamformer configured to generate a vector of transmit beamforming weights in response to the vector of channel estimates.

34. The communications system of claim 33, wherein the phase bits detector is further configured to receive a frame structure from the wireless terminal over a return link control channel, the frame structure including the quantized channel phase values for M number of the plurality of channels, wherein the frame structure includes M number of in-phase (I) quantized channel phase values followed by M number of quadrature (Q) quantized channel phase values.

35. The communications system of claim 34, wherein the phase vector constructor is further configured to generate a channel phase estimate for an mth channel of the plurality of channels in response to an in-phase (I) quantized channel phase value and a quadrature (Q) quantized channel phase value for the mth channel; and
   wherein the vector channel constructor is further configured to construct a channel estimate for the mth channel using the channel phase estimate for the mth channel and a channel gain estimate for the mth channel.

36. The communications system of claim 35, wherein the phase vector constructor is further configured to update the channel phase estimate for the mth channel upon receipt of a most recently received one of the in-phase (I) quantized channel phase value for the mth channel and the quadrature (Q) quantized channel phase value for the mth channel.

37. The communications system of claim 36, wherein the phase vector constructor is further configured to update the channel phase estimate for the mth channel according to the following equation:

$$\hat{\phi}_{n,m} = \frac{1}{2}\left(e^{j\hat{\theta}_{n,m}} + e^{j\hat{\theta}_{n-1,m}}\right)$$

where $\hat{\theta}_{n,m}$ is the in-phase (I) or quadrature (Q) quantized channel phase value for the mth channel received in an nth time index.

38. The communications system of claim 33, further comprising a feed gain database containing average feed gain information, wherein the gain vector constructor is further configured to obtain the channel gain estimates by obtaining an average feed gain value from the feed gain database in response to a location of the wireless terminal.

39. The communications system of claim 38, wherein the gain vector constructor is further configured to receive an indication of the location of the wireless terminal from the wireless terminal.

40. The communications system of claim 39, wherein the adaptive beamformer is further configured to determine the transmit beamforming weights that generate an increased response in a direction of the wireless terminal.

41. The communications system of claim 39, wherein the adaptive beamformer is further configured to determine the transmit beamforming weights that generate a null response in a direction of another wireless terminal.

42. The communications system of claim 33, wherein the quantized channel phase values comprise in-phase (I) and quadrature (Q) quantized channel phase values for the plurality of channels from each of the plurality of antenna feed elements to the wireless terminal; and
wherein the wireless terminal further comprises a frame packer configured to construct a frame structure including the in-phase (I) and quadrature (Q) quantized channel phase values for each of the plurality of channels.

43. The communications system of claim 42, wherein the frame structure comprises M number of in-phase (I) quantized channel phase values and M number of quadrature (Q) quantized channel phase values corresponding to M of the antenna feed elements, and wherein the frame structure comprises the M number of in-phase (I) quantized channel phase values followed by the M number of quadrature (Q) quantized channel phase values.

44. The communications system of claim 33, wherein the phase quantizer is further configured to quantize the channel phase information using a 2-bit quantization for each of the plurality of channels.

45. The communications system of claim 44, wherein the channel phase information comprises in-phase (I) and quadrature (Q) phase information for the plurality of channels from each of the plurality of antenna feed elements to the wireless terminal, and wherein the phase quantizer is further configured to quantize the in-phase (I) phase information with a first bit and the quadrature (Q) phase information with a second bit.

46. The communications system of claim 45, wherein the phase quantizer is further configured to quantize the in-phase (I) phase information as π or 0 and to quantize the quadrature (Q) phase information as π/2 or −π/2.

47. The communications system of claim 33, wherein the wireless terminal further comprises a location determination unit configured to determine a geographic location of the wireless terminal.

48. A method of forming a beam to a wireless terminal from a transmitter including an antenna having a plurality of antenna feed elements, comprising:
receiving quantized channel phase values from the wireless terminal;
obtaining channel gain estimates for each of the plurality of antenna feed elements;
constructing channel estimates for a plurality of channels using the quantized channel phase values and the channel gain estimates; and
determining transmit beamforming weights in response to the channel estimates.

49. The method of claim 48, wherein receiving the quantized channel phase values comprises receiving a frame structure including quantized channel phase values for M number of the plurality of channels, wherein the frame structure includes M number of in-phase (I) quantized channel phase values followed by M number of quadrature (Q) quantized channel phase values.

50. The method of claim 49, further comprising:
generating a channel phase estimate for an mth channel of the M number of the plurality of channels in response to an in-phase (I) quantized channel phase value and a quadrature (Q) quantized channel phase value for the mth channel, wherein constructing the channel estimates comprises constructing a channel estimate for the mth channel using the channel phase estimate and a channel gain estimate for the mth channel.

51. The method of claim 50, further comprising:
updating the channel phase estimate for the mth channel upon receipt of a most recently received one of the in-phase (I) quantized channel phase value for the mth channel and the quadrature (Q) quantized channel phase value for the mth channel.

52. The method of claim 51, wherein updating the channel phase estimate for the mth channel comprises updating the channel phase estimate for the mth channel according to the following equation:

$$\hat{\phi}_{n,m} = \frac{1}{2}\left(e^{j\hat{\theta}_{n,m}} + e^{j\hat{\theta}_{n-1,m}}\right)$$

where $\hat{\theta}_{n,m}$ is the in-phase (I) or quadrature (Q) quantized channel phase value for the mth channel received in an nth time index.

53. The method of claim 48, wherein obtaining the channel gain estimates comprises obtaining an average feed gain value from a feed gain database in response to a location of the wireless terminal.

54. The method of claim 53, further comprising receiving an indication of the location of the wireless terminal from the wireless terminal.

55. The method of claim 48, wherein determining the transmit beamforming weights in response to the channel estimates comprises determining the transmit beamforming weights that generate an increased response in a direction of the wireless terminal.

56. The method of claim 48, wherein determining the transmit beamforming weights comprises determining the transmit beamforming weights that generate a null response in a direction of another wireless terminal.

\* \* \* \* \*

UNITED STATES PATENT AND TRADEMARK OFFICE
CERTIFICATE OF CORRECTION

PATENT NO. : 8,090,041 B2
APPLICATION NO. : 11/624531
DATED : January 3, 2012
INVENTOR(S) : Zheng It is certified that error appears in the above-identified patent and that said Letters Patent is hereby corrected as shown below:

In the Patent:

Column 13, Equation (10), Line 50: Please correct $$X = [h_{1,1} \; h_{1,2} \; \cdots \; h_{M,1}] \begin{bmatrix} w_1 & 0 & \cdots & 0 \\ 0 & w_2 & \cdots & 0 \\ \vdots & \vdots & \ddots & \vdots \\ 0 & 0 & \cdots & w_M \end{bmatrix} \begin{bmatrix} c_1 & c_2 & \cdots & c_Q \\ c_1 & c_2 & \cdots & c_Q \\ \vdots & \vdots & \vdots & \vdots \\ c_1 & c_2 & \cdots & c_Q \end{bmatrix} + n$$

To read $$\mathbf{X} = [h_{1,1} \; h_{2,1} \; \cdots \; h_{M,1}] \begin{bmatrix} w_1 & 0 & \cdots & 0 \\ 0 & w_2 & \cdots & 0 \\ \vdots & \vdots & \ddots & \vdots \\ 0 & 0 & \cdots & w_M \end{bmatrix} \begin{bmatrix} c_1 & c_2 & \cdots & c_Q \\ c_1 & c_2 & \cdots & c_Q \\ \vdots & \vdots & \vdots & \vdots \\ c_1 & c_2 & \cdots & c_Q \end{bmatrix} + \mathbf{n}$$

Column 15, Equation (18), Lines 13-14: Please correct $$\varphi = [\angle h_{2,1} - \angle h_{1,1} \; \angle h_{3,1} - \angle h_{1,1} \; \cdots \; \angle h_{M,1} - \angle h_{1,1}]^T \in \mathbb{C}^{(M-1) \times 1}$$

To read $$\varphi = [\angle h_{2,1} - \angle h_{1,1} \; \angle h_{3,1} - \angle h_{1,1} \; \cdots \; \angle h_{M,1} - \angle h_{1,1}]^T \in R^{(M-1) \times 1}$$

Column 16, Equation (25), Line 60: Please correct $$\hat{W} = \frac{1}{\sqrt{g_1^2 + g_2^2 + \cdots + g_M^2}} [g_1 \; g_2 \hat{\phi}_2^* \; g_3 \hat{\phi}_3^* \; \cdots \; g_M \hat{\phi}_M^*]^T$$

To read $$\hat{\mathbf{W}} = \frac{1}{\sqrt{g_1^2 + g_2^2 + \cdots + g_M^2}} [g_1 \; g_2 \hat{\phi}_2^* \; g_3 \hat{\phi}_3^* \; \cdots \; g_M \hat{\phi}_M^*]^T \in C^{M \times 1}$$

Signed and Sealed this
First Day of May, 2012

David J. Kappos
*Director of the United States Patent and Trademark Office*